(12) United States Patent
Gu

(10) Patent No.: US 8,982,862 B2
(45) Date of Patent: Mar. 17, 2015

(54) MOBILE GATEWAY FOR FIXED MOBILE CONVERGENCE OF DATA SERVICE OVER AN ENTERPRISE WLAN

(71) Applicant: Chris Yonghai Gu, Broomfield, CO (US)

(72) Inventor: Chris Yonghai Gu, Broomfield, CO (US)

( * ) Notice: Subject to any disclaimer, the term of this patent is extended or adjusted under 35 U.S.C. 154(b) by 0 days.

(21) Appl. No.: 14/287,529

(22) Filed: May 27, 2014

(65) Prior Publication Data

US 2014/0269621 A1    Sep. 18, 2014

Related U.S. Application Data

(62) Division of application No. 13/441,262, filed on Apr. 6, 2012, now Pat. No. 8,879,530.

(51) Int. Cl.

| H04W 4/00 | (2009.01) |
|---|---|
| H04W 36/00 | (2009.01) |
| H04W 76/02 | (2009.01) |
| H04W 8/02 | (2009.01) |
| H04W 12/04 | (2009.01) |
| H04W 48/04 | (2009.01) |
| H04W 60/00 | (2009.01) |
| H04W 84/02 | (2009.01) |
| H04W 12/06 | (2009.01) |
| H04W 36/14 | (2009.01) |

(52) U.S. Cl.
CPC .......... *H04W 36/0066* (2013.01); *H04W 84/02* (2013.01); *H04W 12/06* (2013.01); *H04W 76/022* (2013.01); *H04W 36/14* (2013.01); *H04W 8/02* (2013.01); *H04W 12/04* (2013.01); *H04W 36/0038* (2013.01); *H04W 48/04* (2013.01); *H04W 60/00* (2013.01); *H04W 36/0022* (2013.01)
USPC ........................................ 370/338

(58) Field of Classification Search
None
See application file for complete search history.

(56) References Cited

U.S. PATENT DOCUMENTS

| 2004/0192295 A1* | 9/2004 | Tsao et al. ................ 455/432.1 |
|---|---|---|
| 2005/0068929 A1* | 3/2005 | Chang et al. ................... 370/338 |
| 2007/0178905 A1* | 8/2007 | El Mghazli et al. .......... 455/445 |
| 2008/0219218 A1* | 9/2008 | Rydnell et al. ................ 370/331 |
| 2009/0022152 A1* | 1/2009 | Henry et al. .................... 370/389 |
| 2009/0042576 A1* | 2/2009 | Mukherjee et al. ............ 455/436 |
| 2010/0035578 A1* | 2/2010 | Ahmed .......................... 455/411 |
| 2010/0199332 A1* | 8/2010 | Bachmann et al. ................ 726/4 |
| 2011/0035787 A1* | 2/2011 | Naslund et al. .................... 726/3 |
| 2011/0142006 A1* | 6/2011 | Sachs .............................. 370/331 |
| 2011/0216743 A1* | 9/2011 | Bachmann et al. ............ 370/331 |
| 2013/0022033 A1* | 1/2013 | Shi ................................ 370/338 |

(Continued)

*Primary Examiner* — Chirag Shah
*Assistant Examiner* — Amar Persaud

(57) ABSTRACT

A system and a method for providing a mobile data service to a mobile device over a fixed wireless data network wherein the system comprises an enterprise Mobile Signaling Gateway coupled to a Public Land Mobile Network, an enterprise Mobile Access Controller resident within the fixed wireless data network. The system further comprises an enterprise Mobile User-plane Aggregator coupled to 1) the Public Land Mobile Network, 2) the fixed wireless data network and the enterprise Mobile Signaling Gateway. The enterprise Mobile Signaling Gateway at least establishes an IP tunnel to the enterprise Mobile Access Controller, determines whether a mobile device coupled to the Public Land Mobile Network is registered, directs the establishment of multiple IP tunnels between the mobile device and the network elements of the system, and directs pathways for communicating user-plane and control-plane data between trusted or untrusted transport networks.

10 Claims, 22 Drawing Sheets

(56) References Cited

U.S. PATENT DOCUMENTS

| | | | |
|---|---|---|---|
| 2013/0058275 A1* | 3/2013 | Melia et al. | 370/328 |
| 2013/0121322 A1* | 5/2013 | Salkintzis | 370/338 |
| 2013/0265985 A1* | 10/2013 | Salkintzis | 370/331 |
| 2014/0096193 A1* | 4/2014 | Naslund et al. | 726/3 |

* cited by examiner

MOBILE GATEWAY FOR FIXED MOBILE CONVERGENCE OF DATA SERVICE OVER AN ENTERPRISE WLAN

PRIORITY CLAIMS

This application is a division of U.S. patent application Ser. No. 13/441,262, entitled "MOBILE GATEWAY FOR FIXED MOBILE CONVERGENCE OF DATA SERVICE OVER AN ENTERPRISE WLAN" which was filed on Apr. 6, 2012.

TECHNICAL FIELD

Embodiments disclosed herein generally relate to mobile and Wi-Fi data communications and services. More specifically, embodiments relate to providing mobile data services across an enterprise wireless local area network.

BACKGROUND

Mobile Wireless Data Networks (hereinafter "MWDN") and Wireless Local Area Networks (hereinafter "WLAN") provide for wireless data services, however, both networks were designed for differing communication objectives.

MWDN's were designed to provide data communications and services to mobile devices (hereinafter "MD") such as smartphones, mobile broadband data modem cards, etc. MWDN's generally cover large geographical areas (e.g. cities, regions, etc.) permitting mobile devices to remain connected with a Mobile Service Network (hereinafter "MSN") and/or the Internet while the devices move within the coverage area.

WLAN's were designed as a wireless extension of a Local Area Network (hereinafter "LAN") of an enterprise so that fixed-line-connected equipment (e.g. computers, fax machines, etc.) can wirelessly access an Enterprise Service Network (hereinafter "ESN") and the Internet, while the equipment is within the enterprise environment. For purposes of clarity, an enterprise network with a WLAN extension is defined as a Fixed Wireless Data Network (hereinafter "FWDN").

FIG. 1 illustrates a prior art implementation of the interconnection between an MWDN and an FWDN. Both the MWDN 220 and the FWDN 120 are independent from a network deployment and operation point-of-view, although the Radio Frequency (hereinafter "RF") coverage of the MWDN 220 and the FWDN 120 may overlap in their service areas. In other words, the MWDN 220 and the FWDN 120 are two different layers of physical networks, and thus are operationally independent from each other. The RF interface of the MWDN 220 uses a licensed spectrum, while the RF interface of the FWDN 120 uses an unlicensed spectrum.

The MWDN 220 further comprises at least a Mobile Network Gateway (hereinafter "MNG") 224, a Wide Area Network (hereinafter "WAN") 225, and one or more Base Stations (hereinafter "BS") 226. An MD 221 connects to a BS 226 via an RF interface 223. The wireless carrier's MSN 201 connects with the WAN 225 via the MNG 224 over a Backbone Network Link (hereinafter "BNL") 251 to provide mobile data services to the MD 221. The WAN 225 connects with the Internet 901 via the MNG 224 and BNL 252 to provide Internet access to the MD 221. The FWDN 120 comprises at least a Firewall Router (hereinafter "FWR") 124, a LAN 125, and one or more WLAN Access Points (hereinafter "AP") 126. A computer 121 connects to the AP 126 via an RF interface 122. The enterprise's ESN 101 connects with the LAN 125 via the BNL 151 to provide enterprise data services to the computer 121. The FWR 124 connects with the Internet 901 via the BNL 152 to provide Internet access to the computer 121. Both the WAN 225 and the LAN 125 further comprise additional Network Elements (hereinafter "NE") providing various services and functions. From a user data service point-of-view, the MWDN 220 and the FWDN 120 work in different ways. For example, the MWDN 220 employs Internet Protocol (hereinafter "IP") tunneling technologies, whereas the FWDN 120 employs IP routing.

Within the MWDN 220, the MNG 224 is the anchor point for data service connections with the MD 221. In other words, the MD 121 relies on the MNG 224 to reach the MSN 201 for private services and the Internet for public services. It is understood to one skilled in the art that MD 221 may refer to one or more devices. The MNG 224 assigns and manages the IP address of the MD 221. One or more IP tunnels are built between the MNG 224 and the MD 221 to provide point-to-point IP connections, while the BS 226 provides the RF connectivity. When the MD 221 travels within the MWDN 220, the IP tunnel switches from one BS to another BS without losing anchoring to the MNG 224. The MNG 224 can also serve as a firewall to the Internet and may use Network Address Port Translation (hereinafter "NAPT") technology to hide the MD's 221 private IP address from public networks (e.g., Internet). This further improves data security against hackers from the Internet.

Within the FWDN 120, the FWR 124 and the AP 126 act as routers with different functions. The LAN 125 operates with Ethernet. The RF interface between the AP 126 and user devices, such as a computer 121, is a wireless extension of the Ethernet LAN 125. The Computer 121 acquires IP addresses from the ESN 101. The FWR 124 and the AP 126 decide how to route user data (e.g., computer data) to and from external networks (e.g., Internet) based on the user device's IP address. The Computer 121 obtains data services from the ESN 101 without involvement from the FWR 124. The FWR 124 uses NAPT technology to hide the private IP address of the computer 121 from the Internet and improves data security against hackers from the Internet.

The MWDN 220 and the FWDN 120 have been independent from a user data connection point-of-view until the introduction of Smart Mobile Devices (hereinafter "SMD").

FIG. 2A illustrates an embodiment of a network deployment model used by most wireless carriers and enterprises to provide wireless data services to SMD(s) as the current state of the art. In this model, the MWDN 220 works independent from the FWDN 120. However, the same SMD 140 can appear at, for example, location 240, in MWDN 220 or location 242 in FWDN 120 at different times due to mobility of the SMD. Both networks have the capability to authenticate the SMD 140 and grant the device the right of access to the networks, respectively or simultaneously, depending on the RF conditions that the SMD 140 experiences. Therefore, the two networks provide the SMD 140 with access to the MSN 201, the Internet 901, and the ESN 101 depending on the location of the SMD 140.

In one embodiment, the SMD 140 is a multi-functional mobile device having at least one RF interface to the MWDN 220 and at least one RF interface to the FWDN 120. The SMD 140 supports a number of software applications useful for multi-tasking of functions and services on the SMD. One skilled in the art can appreciate that an SMD includes, but is not limited to, smart phones, tablet computers, netbooks, eReaders, or any other mobile device capable of communication with both an FWDN and an MWDN.

The SMD 140 can access both the MSN 201 and the Internet 901, through the RF interface 223, when the SMD 140 travels within the RF coverage of the MWDN 220 (e.g., location 240). In this case, the SMD 140 uses the IP tunnel 211 to reach the MNG 224 which, in turn, communicates with the MSN 201 via the BNL 251 for mobile data services and with the Internet 901 via the BNL 252 for mobile internet access.

In another embodiment, when the SMD 140 moves into location 242, the SMD 140 uses both the RF interface 223A and the RF interface 122 to access the MSN 201 and the Internet 901. In such a scenario, the SMD 140 is within an overlapped RF coverage area between both the MWDN 220 and the FWDN 120. In this case, the SMD 140 at location 242 uses the IP tunnel 212 to receive mobile data services provided by the MSN 201 (via the MNG 224 and the BNL 251.) The SMD's 140 access to the Internet 901 is received through the IP route 111 provided by the AP 126, the LAN 125 and the FWR 124.

FIG. 2B illustrates an alternative embodiment of a network deployment model used by most wireless carriers and enterprises as the current state of the art. This embodiment illustrates an example of user data connections when the RF coverage of the MWDN 220 does not overlap with the RF coverage of the FWDN 120, for example the basement of an office building in the FWDN. In this case, when an SMD 140 travels within the MWDN 220 (e.g., Location 240), the SMD 140 accesses the MSN 201 and the Internet 901 via an IP tunnel 211 established between the MNG 224 and the SMD 140 over the BS 226 and the WAN 225. After the SMD 140 travels into the FWDN 120 and stays at a location where only the RF coverage of FWDN 120 exists, for example location 243 in the illustration of this figure, the SMD 140 loses IP tunnel connection 221 with the MSG 224 and, consequently loses the ongoing mobile data services from the MSN 201 and the Internet 901, due to the loss of RF connection between the MWDN 220 and the SMD 140 at Location 243. In order to re-gain the mobile data connections, the SMD 140 at Location 243 uses the FWDN 120 to access the Internet 901 through the FWDN 120 via a new IP route 111. However, the FWDN 120 cannot connect directly to the MSN 201. Therefore, the SMD 140 cannot access the MSN 201 through the FWDN 120 for the mobile data services offered by the MWDN operator. This becomes an issue if 1) the RF coverage of the MWDN 220 does not overlap with the RF coverage of the FWDN 120; or 2) the SMD 140 automatically shuts down its RF interface to the MWDN 220 when the SMD 140 connected with the FWDN 120 (e.g., RF interface 122) due to any design considerations.

An exemplary solution to the problem is to introduce a security gateway (hereinafter "SeGW") into the MWDN. As such, FIG. 3 illustrates an embodiment of a network architecture where an MWDN 220 and an FWDN 120 are bridged through a SeGW 302 to provide mobile data service over the FWDN 120. In this architecture, the SeGW 302 serves as an end point of an IP security (hereinafter "IPsec") tunnel 218. The IPsec tunnel 218 interconnects the SeGW 302 to the SMD 140 while traveling within the coverage area of the FWDN 120 (e.g., Location 244). The interconnection further travels through the FWDN 120 and the Internet 901 (via the BNL 152 and the BNL 153.) After the IPsec tunnel 218 is established, the SeGW 302 launches an IP tunnel 219 to the MNG 224. The cascaded IPsec tunnel 218 and IP tunnel 219 allow the MNG 224 to serve as the sole gateway between the SMD 140 and both the Internet 901 (via the BNL 252) and the MSN 201 (via the BNL 251).

In this embodiment, the MNG 224 assigns and manages the SMDs 140 IP addresses for access to both the Internet 901 and the MSN 210 (whether connecting via the MWDN 220 or the FWDN 120.) When the SMD 140 travels between each of the two data networks, the MNG 224 switches the IP tunnels between the SMD 140 and the MNG 224 without changing the SMDs 140 IP addresses whether the SMD 140 travels into Location 240 or Location 244. Thus, the SMDs 140 mobility is hidden from the MSN 201. Therefore, the SMD 140 maintains IP session continuity with the MSN 201 and/or the Internet 901. In one embodiment, the mobile traffic includes the network control-plane (signaling data), which is highly sensitive data. Therefore, the control-plane should be protected against potential security threats from the Internet 901. The purpose of the IPsec 218 is to protect against such threats.

The MWDN and the FWDN are standardized by multiple international standards bodies such as:

The Third Generation Partnership Project (hereinafter "3GPP") is a European telecommunication standards body within the European Telecommunications Standards Institute (hereinafter "ETSI"). 3GPP has led the development of mobile communication standards targeted at international markets. The first data-only mobile network is called the 3GPP Long Term Evolution (hereinafter "LTE"), initially released in 3GPP Release 8. LTE has been well accepted by mobile operators throughout the world and has been commercially deployed in the U.S. and other countries.

The Institute of Electrical and Electronics Engineering (hereinafter "IEEE") is an international professional association, which has led the development of WLAN communication standards. The well accepted IEEE 802.11 WLAN standard has led to Wi-Fi networks throughout the world. In much of the world, the terms Wi-Fi, WLAN, and IEEE 802.11 have become synonymous with each other.

FIG. 4A illustrates an embodiment of a 3GPP LTE-based MWDN interworked with an IEEE WLAN-based FWDN. The LTE 220 network consists of at least an Evolved Node Bs (hereinafter "eNB") 226A, a Servicing Gateway (hereinafter "S-GW") 412, a Packet Data Network Gateway (hereinafter "P-GW") 202A, a Mobility Management Entity (hereinafter "MME") 411 and mobile equipment (hereinafter "UE") 140A. To provide interworking with a WLAN 120, the 3GPP LTE 220 network architecture includes an Evolved Packet Data Gateway (hereinafter "ePDG") 302A. In order to simplify references to network elements, the 3GPP has defined a name for each interface between a pair of network elements. For example, the interface between the P-GW 202A and the ePDG 302A is S2b, the interface between the eNB 226A and the MME 411 is S1-MME, etc. Each interface comprises the control-plane (the network signaling data) and/or user-plane (the subscriber data) depending on the nature of the interface.

A UE is an SMD or mobile station such as a smartphone. The UE 140A provides mobile data services to a user according to the service contract signed with a Public Land Mobile Network (hereinafter "PLMN") operator, i.e. wireless carrier. The UE 140A has a radio receiver and transmitter for communications with the PLMN. The UE 140A usually includes multiple radio receivers and transmitters in order to support multiple mobile air interface standards. Such standards include the LTE-Uu interface for LTE access and the IEEE 802.11 (i.e., Wi-Fi) interface for non-3GPP (WLAN) access.

The eNB 226A is the BS that provides air interface LTE-Uu to the UE 140A. The eNB 226A also communicates with both the MME 411 over the S1-MME interface and the S-GW 412 over the S1-U interface. The LTE-Uu passes both the user-plane and the control-plane between the UE 140A and the eNB 226A. The eNB 226A and the UE 140A use data encryption to cipher data traveling through the LTE-Uu. On the network side, only Non-Access Stratum Messages (hereinafter "NAS") (i.e. the control-plane) exchanged over the S1-MME interface are encrypted. The user-plane exchanged over the S1-U interface is unencrypted. The S1-MME interface only carries the control-plane information while the S1-U interface only carries the user-plane information.

The S-GW 412 tunnels the UE 140A user-plane data from the eNB 226A to the P-GW 202A. The S-GW 412 also acts as a UE mobility anchor point. The S-GW 412 communicates with eNB 226A over the S1-U interface. The S1-U interface utilizes a "GPRS Tunneling Protocol—User-Plane" (hereinafter "GTP-U"). GPRS stands for Generic Packet Radio Service, which was standardized by the ETSI as the legacy Second Generation (hereinafter "2G") mobile network technology. The S-GW 412 switches the GTP-U tunnel from one eNB to the other in order to maintain an uninterrupted data connection with the UE 140A when the UE 140A performs an inter-eNB handover. The S-GW 412 communicates with the P-GW 202A over the S5 interface, which consists of both a user-plane and a control-plane. The S5 interface utilizes the GTP-U protocol for its user-plane, while utilizing a "GPRS Tunneling Protocol—Control-Plane" (hereinafter "GTP-C") for its control-plane. The S-GW 412 also acts as the anchor point for other 3GPP network elements, such as a Serving GPRS Support Node, in order to communicate with other 3GPP networks.

The P-GW 202A is the MNG that provides connectivity between the UE 140A and an external Packet Data Network (hereinafter "PDN"), such as 1) the MSN 201 of the wireless carrier or 2) the Internet 901. The UE 140A may connect to multiple PDNs through the same P-GW 202A. Each PDN can be identified by an Access Point Name (hereinafter "APN"). The P-GW 202A acts as the GTP-U tunnel termination point for the delivery of the UE 140A user traffic. The P-GW 202A also manages the IP address of the UE 140A data connection to a PDN. The UE's 140A IP address may come out of an IP Address Pool held by either the P-GW 202A or the PDN. The P-GW 202A performs policy enforcement, packet filtering, charging support, and lawful interception. It is often customary for the MSN 210 to be located within a PLMN.

The MME 411 provides mobility management for any UE connections in the LTE network 220. The MME 411 communicates with the eNB over the S1-MME interface. Further, the MME 411 communicates with the S-GW 412 over the S11 interface. Both interfaces belong to the LTE network control-plane. The MME 411 maintains a database of mobile location tracking information as a means of limiting the MME's 412 paging area. When the UE 140A moves from one cell to another, the cell tower's identification and the tracking area's identification are recorded into the database. The MME 411 is responsible for choosing the S-GW 412 for the UE 140A at both the initial attachments as well as during the inter S-GW handover. The MME 411 interfaces with a Home Registration Sub-System (hereinafter "HSS") 413 over the S6a interface. The HSS 413 maintains the UE 140A identification information, access authentication and encryption keys.

The HSS 413 is a database of UE subscription information. Similar subscription information is maintained in a Subscriber Identification Module (hereinafter "SIM") residing inside the UE. Both the HSS 413 and the SIM (not shown) have the same root encryption key for user identification, service authentication and user data encryption.

The ePDG 302A is the SeGW that provides LTE and non-3GPP network inter-connections. The ePDG 302A communicates with the P-GW 202A over the S2b interface. Further, the ePDG 302A communicates with a "3GPP Authentication, Authorization and Accounting" (hereinafter "3GPP AAA") 525 server over the SWm interface. As the SeGW, the ePDG 302A provides termination of the IPsec tunnel built between the UE 140A and the ePDG 302A through the FWDN 120 over the SWn interface when the UE 140A travels into the RF coverage of the FWDN 120. The P-GW 202A serves as the anchor point for the point-to-point IP connectivity between the UE 140A and the P-GW 202A. The P-GW 202A serves as the anchor point whether the UE 140A is connected: 1) to the P-GW 202A over the LTE-Uu air interface of the LTE network; or 2) the Wi-Fi air interface of the FWDN 120.

The 3GPP AAA 525 server is designed to interface with the ePDG 302A, over the SWm interface, as a means of providing Authentication, Authorization and Accounting (hereinafter "AAA") services to the UE 140A in order to establish the SWn interface (e.g., IPsec tunnel). The 3GPP AAA 525 server exchanges user profile information with the HSS 413 over the SWx interface. This exchange ensures that the AAA service can be provided under the same user profile, stored in the HSS 413, no matter which network the UE 140A connects.

As illustrated in FIG. 4A, when the UE 140A moves from the LTE-based MWDN 220 to the WLAN-based FWDN 120, but before it connects with the P-GW 202A over the S2b interface, the UE 140A has to build the SWn connection with the ePDG 302A. As an exemplary embodiment, and according to 3GPP standards, a process of building the SWn connection is described as follows:

1. The UE 140A gains access to the FWDN 120, (i.e. enters the Wi-Fi access network and acquires a local IP address from an ESN 101) assuming the UE 140A has permission and has been locally authenticated (i.e. by the enterprise network.)
2. The UE 140A acquires the ePDG's 302A IP address through the FWDN 120. Alternatively, the IP address is pre-programmed into the UE 140A. Knowledge of the IP address allows the UE 140A access to the ePDG 302A from the FWDN 120. The UE 140A contacts the ePDG 302A, through a FWR 124 of the FWDN 120, by using an "Internet Key Exchange Protocol—Version 2" (hereinafter "IKEv2") protocol for non-3GPP access authentication.
3. After the IKEv2 authentication request is received, the ePDG 302A reaches the 3GPP AAA 525 server over the SWm interface.
4. The 3GPP AAA 525 server uses an "Extensible Authentication Protocol-Authentication and Key Agreement" (hereinafter "EAP-AKA") and the user profile information, obtained from the HSS 413 over the SWx interface, to perform mutual authentication with the UE 140A.
5. Next, both the ePDG 302A and the UE 140A obtain valid encryption keys to build a secure association between them. Finally the IPsec tunnel is built as a part of the SWn interface. The tunnel goes through the AP 126, the LAN 125, and the FWR 124 all from within the FWDN 120. The tunnel is used to deliver both the user-plane and control-plane data between the UE 140A and the MWDN 220.

FIG. 4B illustrates an embodiment of a representative LTE network as an interface to an ePDG. The LTE network 402 at least comprises a P-GW 411, an S-GW 412, an HSS 413, an MME 414, and an eNB 415. External to the LTE Network 402 is an ePDG 302A, a 3GPP AAA 525 Server, a UE 140A, a PDN 401, and the Internet 901. The LTE Network 402 further comprises a plurality of interfaces connecting the internal and/or external components (e.g., SGi, S5, S11, S1U, S1-MME, S6a, SWx, S2b, LTE-Uu, etc.) The LTE is a data-only mobile network providing packet data services to mobile devices. Each interface may carry control-plane and/or user-plane depending on the specifications from the 3GPP standards. For example, the S2b interface carries both the control-plane and the user-plane information. The S6a interface only carries the control-plane data. The S5 interface transports both the control-plane and the user-plane data. Like the S2b interface, the control-plane of the S5 interface uses GTP-C while its user-plane complies with the GTP-U protocol. The P-GW 411 and the S-GW 412 use the control-plane (in GTP-C) to exchange signaling information in order to set up the user-plane (in GTP-U) of the S5 interface.

Each interface used for connecting a pair of network elements has a name defined by the standards. An instance of a network interface implies a copy of a defined interface which has all the features and capability of the original interface standard. For example, an instance of the S5 interface is a copy of the 3GPP standard S5 interface defined for a given pair of P-GW 411 and S-GW 412 network elements.

FIG. 4B further illustrates an embodiment of an S2b interface as defined by the 3GPP. The S2b interface 430 consists of the control-plane and the user-plane. The control-plane uses the GTP-C protocol while the user-plane uses the GTP-U protocol. After the SWn connection is built, the ePDG 302A reaches out to the P-GW 411 over the control-plane (GTP-C) of the S2b interface to set up the user-plane context. The ePDG 302A further constructs the GTP-U tunnel to transport the network user-plane data between the ePDG 302A and the P-GW 411. According to the 3GPP standards, GTP-U and GTP-C tunnels can be transported on top of any IP connections using a User Datagram Protocol (hereinafter "UDP"), which is one of the core members of the Internet Protocol (IP) Suite used by the Internet 901. L1 standards for the physical layer of a network interface. L2 standards for the data link layer of the network interface. The main function of the L2 is to facilitate the interconnection between the IP layer and the physical layer (L1) of the network interface.

FIG. 4C further illustrates an embodiment of an MWDN and an FWDN and IP tunnel connections connecting one or more of the network elements. The MWDN 220, which is an LTE-based network, comprises a plurality of components such as a P-GW 202A, an S-GW 412, an eNB 226A, and an ePDG 302A. The FWDN 120, which is a WLAN-based network, comprises a plurality of components such as an FWR 124, an AP 126, and an LAN 125. External to both networks is an UE 140A, an MSN 201 and the Internet 901. The UE 140A can travel between the MWDN 220 and the FWDN 120, and can connect with one or both of the networks over LTE-Uu interface and/or Wi-Fi interface depending on the location of the UE between the networks and the availability of the LTE-Uu and Wi-Fi interfaces.

Further, a plurality of interfaces connects each of the internal and external network elements together. There is also an IP tunnel 417 between the UE 140A and the P-GW 202A, via the S-GW (S5 interface), and an IP tunnel 418 via the ePDG (S2b interface cascaded with the SWn interface). The P-GW 202A switches or maintains both the S5 and S2b interfaces for the IP connections between the P-GW 202A and the UE 140A to allow for IP session continuity as the UE 140A moves between the MWDN 220 and the FWDN 120. Depending on the capability of the UE 140A and the RF coverage of the MWDN 220 and the FWDN 120, the P-GW 202A may use one or both of the IP tunnels to provide services to the UE 140A.

The 3GPP standards define two variations of protocol stacks for both the S5 and S2b interface. The first variation uses GTP, as illustrated in FIG. 4B. The second variation uses a "Proxy Mobile IP Protocol—Version 6" stack (hereinafter "PMIPv6") or dual stacks PMIPv4/v6 (hereinafter "DSMIPv6"), developed by the Internet Engineering Task Force (hereinafter "IETF"). The PMIPv6 or DSMIPv6 is intended for trusted non-3GPP network interworking, e.g. CDMA2000 EV-DO (Code Division Multiple Access 2000 Evolution, Data Only) networks. For untrusted non-3GPP interworking (e.g. WLAN Wi-Fi networks), the choice of the S2b interface protocol is determined by the infrastructure of the LTE network. For the sake of clarity of description hereafter, GTP is chosen as an example.

The standardized LTE/non-3GPP interworking architecture may provide IP session continuity whether a UE is connected with a P-GW over the LTE-based MWDN or the WLAN-based FWDN. However, there are several shortcomings such as:

1. It is not always be possible for an FWR to allow pass-through of an IPsec tunnel, within an SWn interface, from a UE to an ePDG. This assumes the FWR is resident in an FWDN and the ePDG is resident in an MWDN. For example, in an enterprise environment, the FWR is a part of the corporate security gateway system. The general IT policy of an enterprise may not allow IPsec tunneling through a corporate firewall, out of a computer, to outside networks such as the Internet. Such IT policies would also disallow such tunneling from a mobile device within the enterprise campus (e.g., WLAN). In this case, establishment of a SWn connection between a mobile device and an ePDG becomes impossible. Therefore, the interworking between the LTE and the WLAN networks becomes hindered.

2. When a mobile device is behind an enterprise FWR (i.e., connected with the enterprise WLAN) the IT manager of the FWDN may not have control over the MWDN connection of the mobile device while inside the enterprise. For example, the mobile device's connection 417 to the Internet, via the LTE network MWDN 220 through the BNL 252, bypasses the corporate FWR 124 thus providing an unprotected backdoor from the Internet 901 into the corporate enterprise LAN 125 through the mobile device UE 140A even though the corporation LAN 125 is protected by the FWR 124 for the internet access over the BNL 152.

3. A dual-access (e.g., LTE and Wi-Fi) tablet or laptop computer with access to external networks from within a LAN environment creates inconsistent IT management policy and/or policy enforcement. For example, the FWR 124 of the LAN 125 may impose content filtering on the traffic from the device to/from the Internet to comply with corporate IT policy and/or government regulations. Compliance will break if the device accesses the Internet through the LTE-Uu interface and the IP connection 417 of the MWDN 220 rather than through corporate Wi-Fi connection of the FWDN 120.

4. A possible solution to the above problem is to force the mobile device to disengage the IP tunnel 417 between the device and the P-GW over the LTE-Uu interface as soon as the device enters the FWDN. Consequently, the device is forced to take only the FWDN-ePDG-P-GW route (e.g., IP tunnel 418) for Internet access. The downside to this approach is reliance that the device or the user will take the expected action. Additionally, MWDN bandwidth is wasted delivering Internet-bound device traffic, and the UE 140A may lose the capability to directly access ESN 101 for enterprise IT services simultaneously.

5. Another potential solution to the above problem is to allow the device Internet access as usual by sending the connection through the FWDN without relying on an ePDG. For example, the UE 140A accesses the Internet through the corporate firewall FWR 124 and the BNL 152 like any corporate computer does. While this approach may save MWDN bandwidth, the MWDN operator loses traffic routing management capability. Such management capabilities allow for potential content-based value-added services (e.g., mobile behavior analytics, etc.)

6. If the P-GW acts as an anchor point for all IP traffic flowing from a mobile device, the device must use an IPsec tunnel (e.g., SWn interface) for mobile data security and 3GPP standards compliance. Given the large number of mobile devices within an enterprise campus, costs of the IPsec tunnel on the FWDN must be considered. Consequently, both the MWDN operator and the FWDN owner (the enterprise) expect increased costs due to the overhead introduced by the SWn interface as described above.

The present invention provides one or more solutions to the above-described shortcomings of the 3GPP standardized MWDN-FWDN interconnections.

SUMMARY

Embodiments presently disclosed generally relate to mobile data communications and services. More specifically, embodiments herein relate to managing and administering mobile data services over a WLAN within an enterprise network.

In one embodiment, a method for providing mobile data service to a mobile device over a Fixed Wireless Data Network (FWDN) is described. The method comprises the coupling of a Mobile Wireless Data Network (MWDN) with the FWDN via an IP Transport Network (IPTN) via a first, second and third Internet Protocol Transport Network (IPTN). Next, a mobile data service request is received from a Public Land Mobile Network (PLMN), wherein the PLMN is coupled to the MWDN via a fourth IPTN. Next, a confirmation is made that the mobile device associated with the mobile data service request is coupled to and located with the FWDN. Such authentication occurs through the interception of registration and location information transmitted from the mobile device. Next, the authenticity of the mobile data service request is verified. Lastly, mobile data service is delivered to the mobile device such that communication to between the mobile device and the PLMN is transparent.

Additionally, user-plane data and control-plane data of the mobile device is received and separated. A determination is made as to whether the user-plane data should be communicated to the MWDN via a trusted or untrusted IPTN. Further, the control-plane data provides instructions for the determination. Next, the user-plane is delivered to the mobile device.

In another embodiment, a system is provided for providing a mobile data service to a mobile device over an FWDN. The system comprises an enterprise Mobile Signaling Gateway (eMSG) coupled to a PLMN, wherein the eMSG is further coupled, via a first IPTN, to an enterprise Mobile Access Controller (eMAC) resident in and coupled to the FWDN. At least one mobile device is also coupled to the FWDN. The system further comprises an enterprise Mobile User-plane Aggregator (eMUA) communicatively coupled to 1) the PLMN, 2) the FWDN, via a second IPTN, 3) the FWDN, via a third IPTN, and 4) the eMAC, via the first IPTN, wherein the second IPTN is an untrusted network and the third IPTN is a trusted network. Additionally, the eMUA and the eMSG are configured to communicate with each other via an IP connection.

In one embodiment, the eMSG provides a number of functions such as establishing a first IP tunnel to the eMAC for provision of IP connections. Additionally, the eMSG determines whether the at least one mobile device coupled to the PLMN is registered. The eMSG further directs the eMAC to establish an IP tunnel with the mobile device, the eMUA to establish an IP tunnel to the PLMN, and the eMAC and eMUA to establish an IP tunnel between each other.

DETAILED DESCRIPTION

Definition of Frequently Used Terms

A network element (NE) is a physical entity of a communication network and provides at least a set of network functions defined by telecommunication standards. An NE may have multiple pre-defined interfaces to inter-connect with other NE's to form a communication network. Each interface may deliver user-plane and/or control-plane protocol data according to the network standards applied.

An NE at the edge of a network, or an edge NE, is a gateway that is employed as a communicative conjunction to inter-connect with other NE's inside the network and other NE's outside the network.

eMLAN stands for enterprise Mobile Local Area Network. An eMLAN comprises one or more enterprise Mobile User-Plane Aggregators (eMUA), one or more enterprise Mobile Access Controllers (eMAC) and one or more enterprise Mobile Signaling Gateway (eMSG). eMUA and eMSG are edge NE(s) of the MWDN 220 included in the present invention. eMAC is an edge NE of the FWDN 120 included in the present invention.

3GPP stands for the $3^{rd}$ Generation Partnership Project, which is a European standards body under the European Telecommunications Standards Institute (hereinafter "ETSI").

3GPP LTE network is the Long Term Evolution (LTE) network standardized by the 3GPP.

GPRS stands for General Packet Radio Services, which is the legacy $2^{nd}$ generation mobile communication system standardized by the 3GPP.

GTP stands for GPRS Tunneling Protocol standardized by the 3GPP. GTP is a broad term having multiple variations (e.g. GTP-C, GTP-U, etc.)

GTP-U stands for GPRS Tunneling Protocol for the User-plane. GTP-U is a variation of the GTP.

GTP-C stands for GPRS Tunneling Protocol for the Control-plane. GTP-C is a variation of the GTP.

MSN stands for Mobile Service Network.

A Packet Data Network (PDN) is an MSN providing packet data services to mobile devices.

3GPP AAA is a network entity defined and standardized by the 3GPP for authentication, authorization and accounting (AAA) services to mobile devices.

ePDG stands for Evolved Packet Data Gateway, which is standardized by the 3GPP for the LTE and non-3GPP network interworking.

Figure 1:
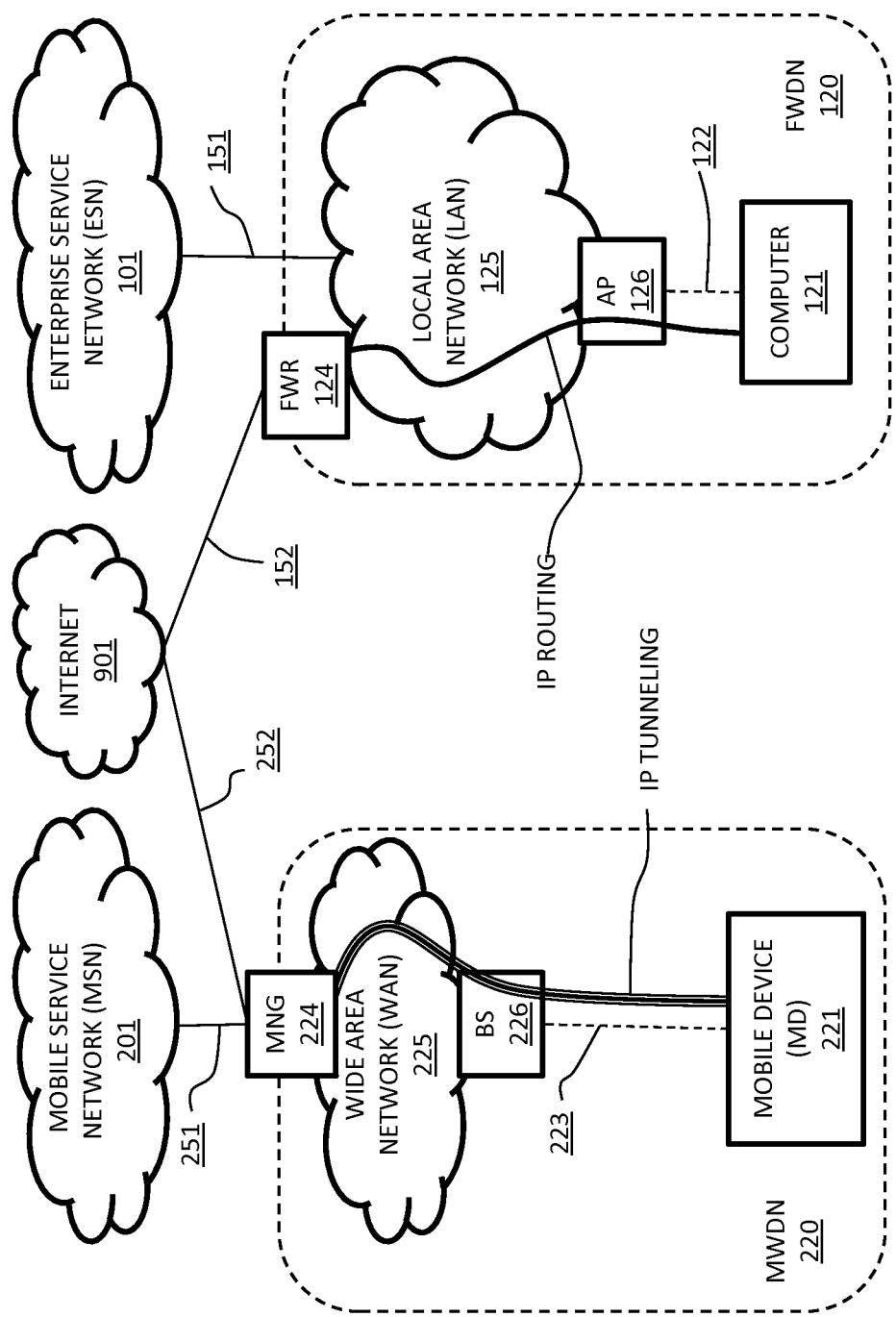
FIG. 1 illustrates a prior art implementation of the interconnection between an MWDN and an FWDN
Figure 2A:
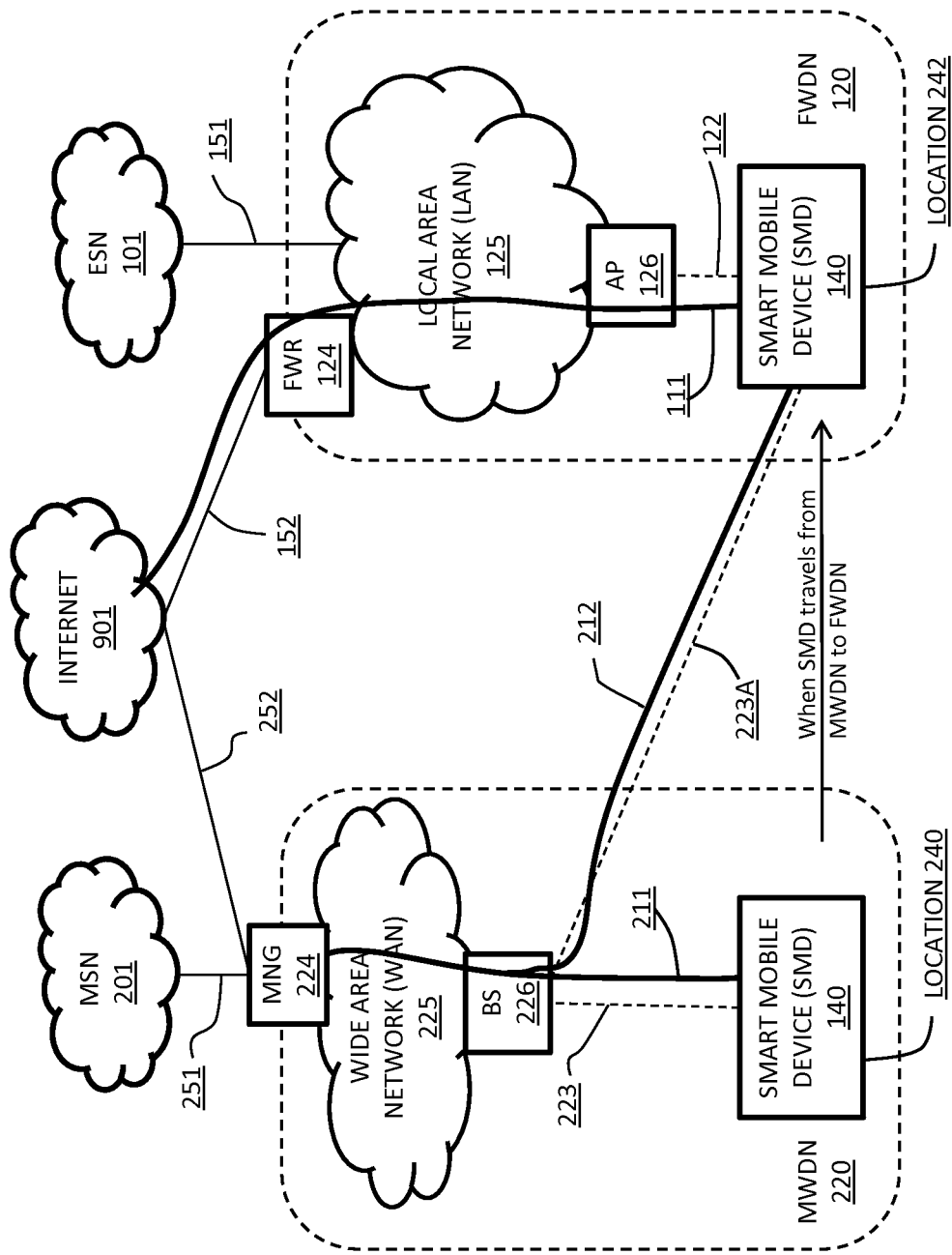
FIG. 2A illustrates a prior art embodiment of a network deployment model used by most wireless carriers and enterprises.
Figure 2B:
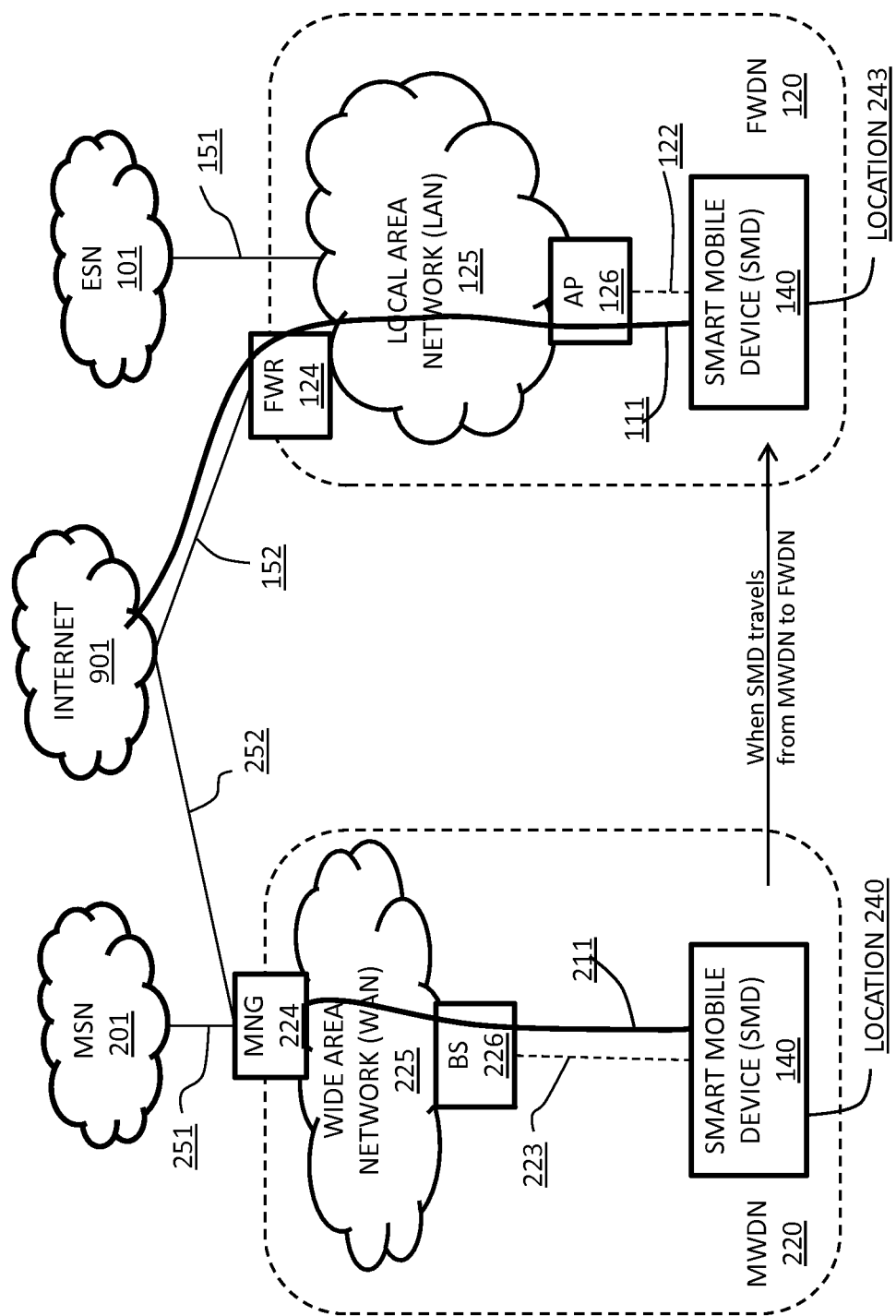
FIG. 2B illustrates an alternative prior art embodiment of a network deployment model used by most wireless carriers and enterprises.
Figure 3:
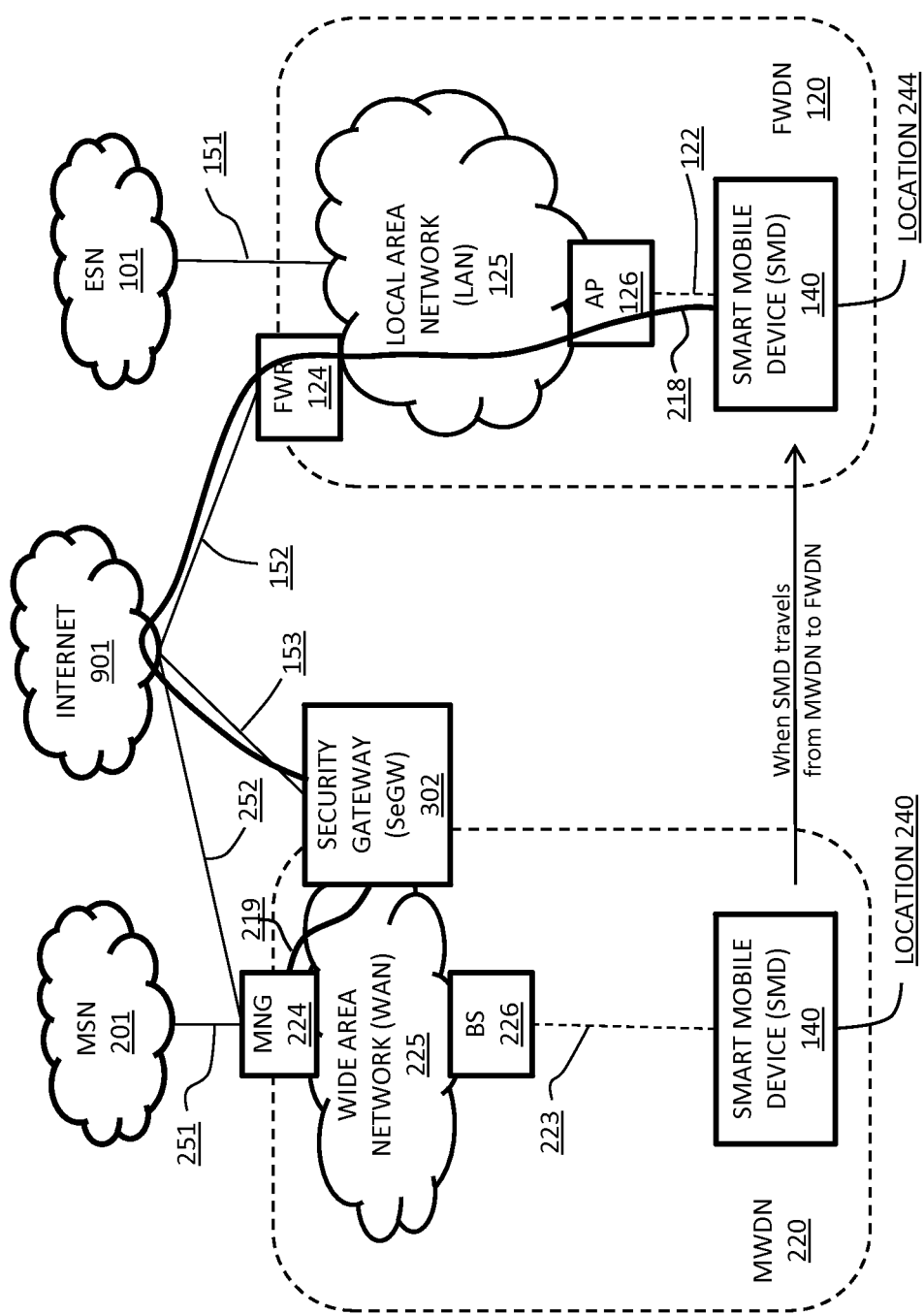
FIG. 3 illustrates a prior art embodiment of a network architecture where an MWDN and an FWDN are bridged through an SeGW to provide mobile data service over the FWDN.
Figure 4A:
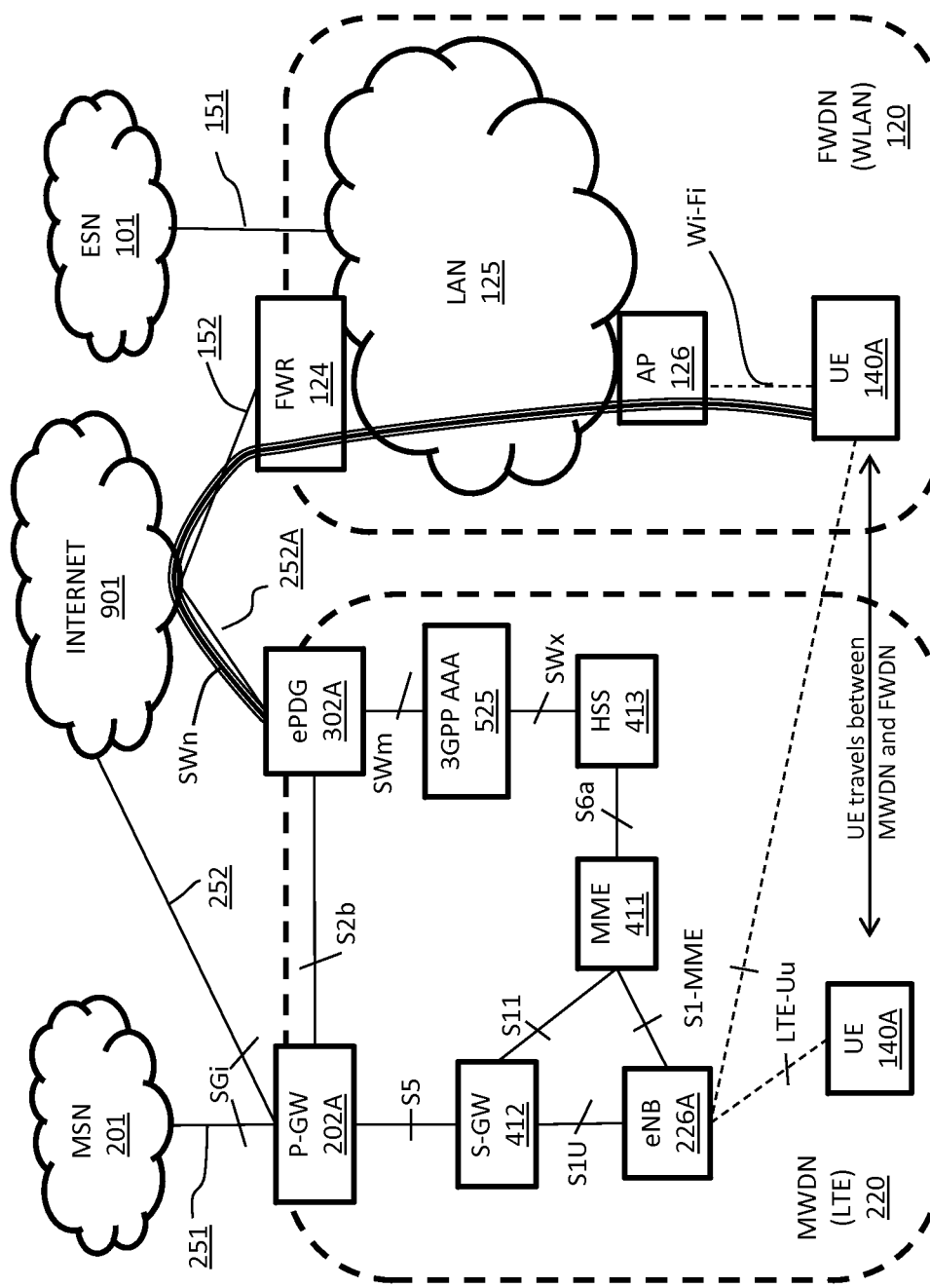
FIG. 4A illustrates a prior art embodiment of a 3GPP LTE-based MWDN interworked with an IEEE WLAN-based FWDN.
Figure 4B:
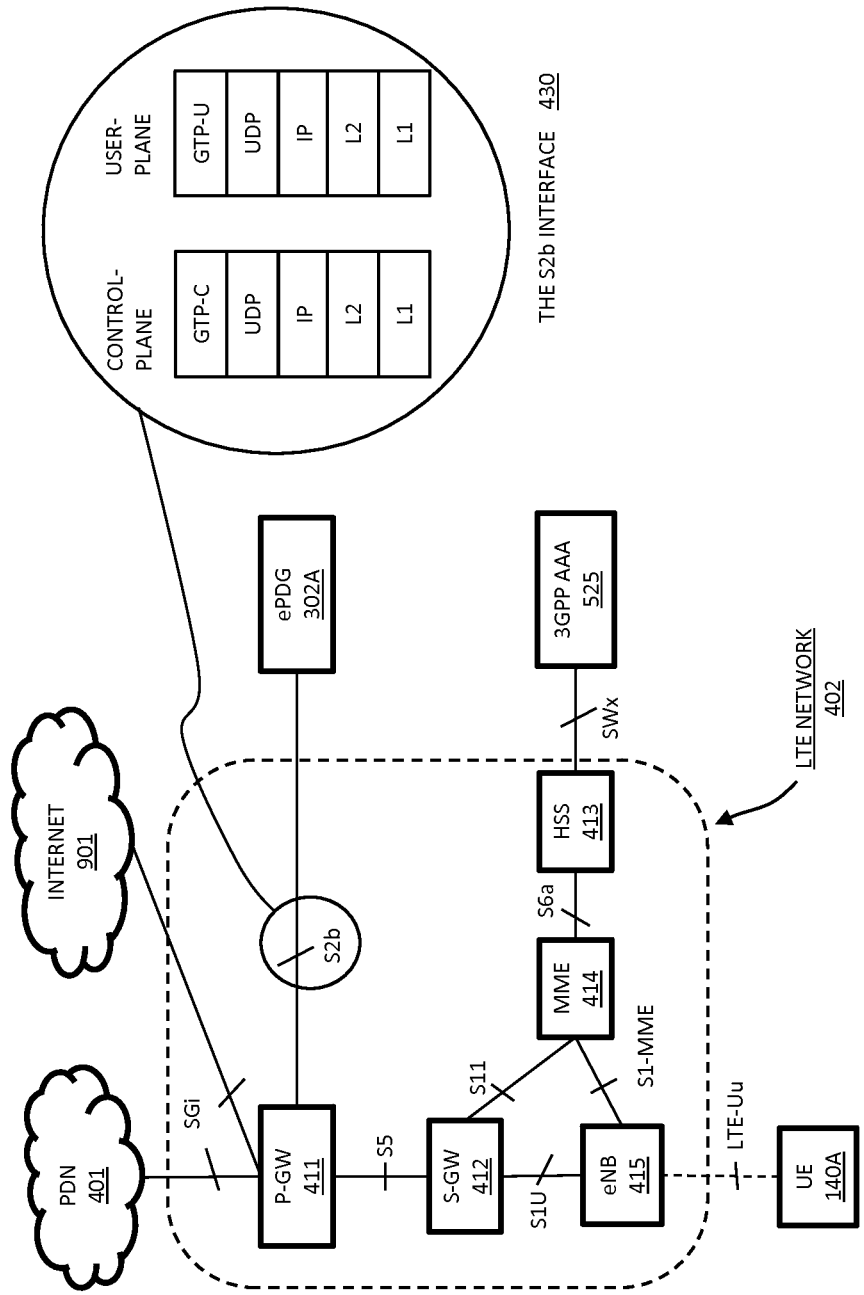
FIG. 4B illustrates a prior art embodiment of a representative LTE network and an interface to an ePDG.
Figure 4C:
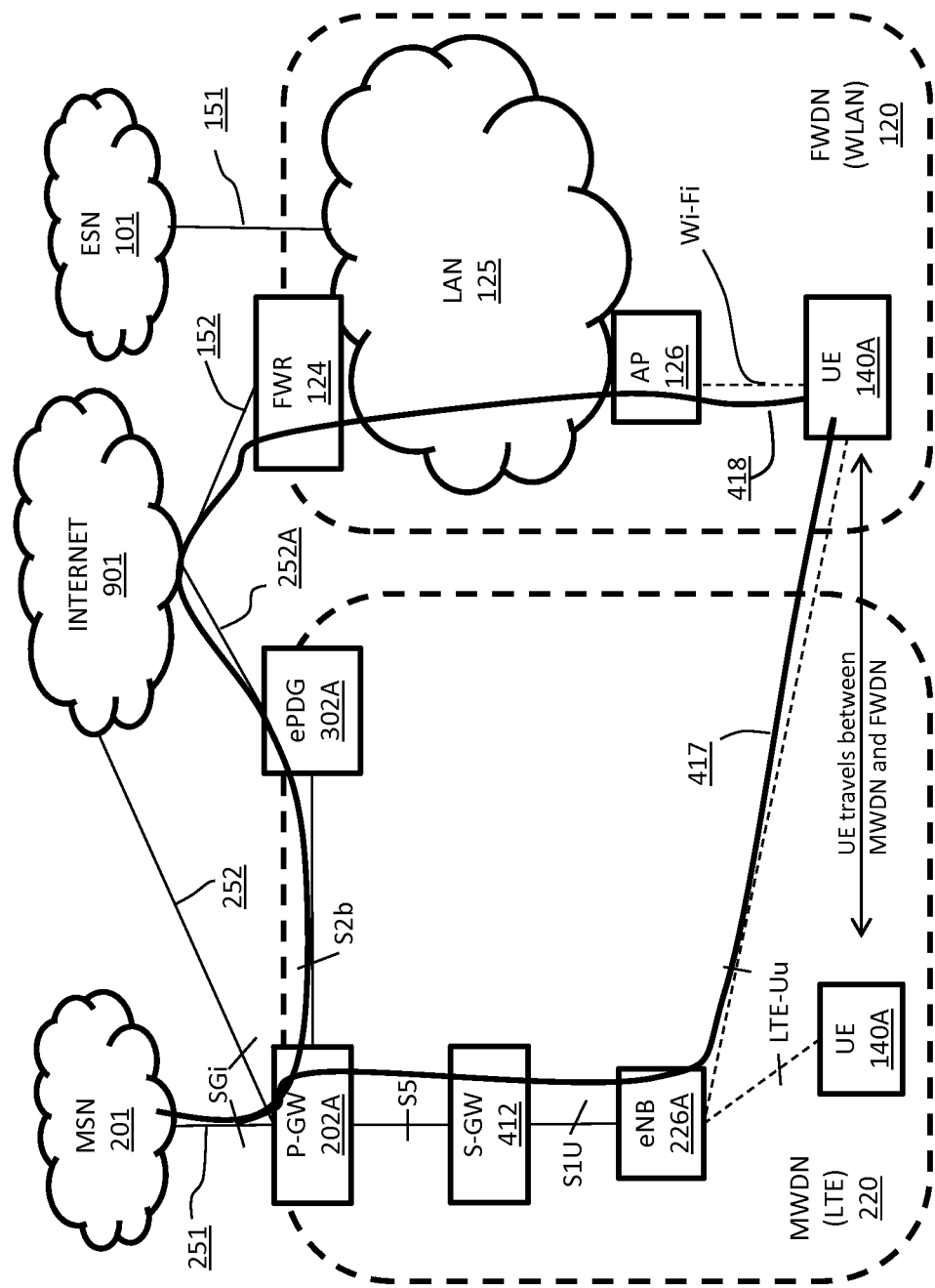
FIG. 4C illustrates a prior art embodiment of an MWDN and an FWDN and IP tunnel connections connecting one or more network elements.
Figure 5A:
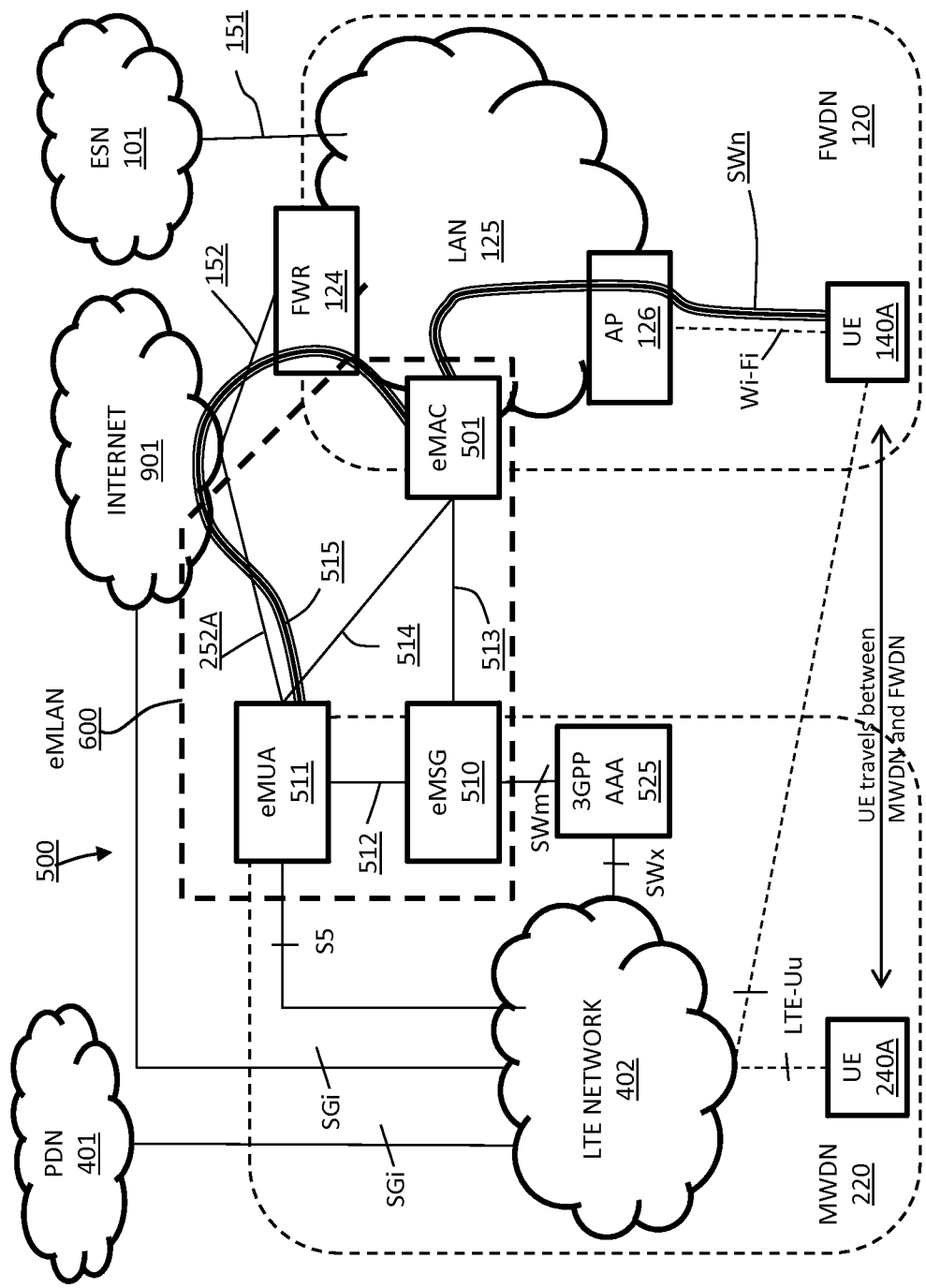
FIG. 5A illustrates an embodiment of a network architecture and a plurality of communication flows between various components within the architecture.

FIG. 5A illustrates an embodiment of a network architecture and a plurality of communication flows between various components within the architecture. The network architecture 500 comprises an MWDN 220 in communication with an FWDN 120 through an Enterprise Mobile LAN (hereinafter "eMLAN") 600. The eMLAN 600 is shown in dashed-line area of FIG. 5. The eMLAN 600 comprises one or more Enterprise Mobile Access Controllers (hereinafter "eMAC") 501, one or more Enterprise Mobile User-Plane Aggregators (hereinafter "eMUA") 511, and one or more Enterprise Mobile Signaling Gateways (hereinafter "eMSG") 510. In one embodiment, the eMSG 510 and the eMUA 511 reside within the MWDN 220. Whereas, the eMAC 501 resides within the FWDN 120. The eMUA 511 and the eMAC 501 may communicate with each other over an interface 515 (hereinafter "I515") and/or an interface 514 (hereinafter "I514") for exchanging user-plane data between the MWDN 220 and the FWDN 120. The eMSG 510 and the eMAC 501 may communicate with each other over an interface 513 (hereinafter "I513") for exchanging control-plane data between the MWDN 220 and the FWDN 120. The eMSG 510 communicates with the eMUA 511 over the interface 512 (hereinafter "I512") for exchanging control-plane data of the eMLAN 600. The MWDN 220 further comprises a standard 3GPP AAA 525 server in communication with an LTE Network 402. The LTE Network 402 provides service to a smart mobile device (hereinafter "UE") 240A, over a standard LTE-Uu interface. In one embodiment, the eMUA 511 and the eMSG 510 are edge Network Elements (NE) of the MWDN 220.

The eMUA 511 may communicate with the LTE Network 402 via a standard S5 interface. The eMSG 510 communicates with the 3GPP AAA 525 server via a 3GPP standard SWm interface. The standard 3GPP AAA 525 server communicates with the eMSG 510 via the SWm interface and communicates with the LTE Network 402 via the 3GPP standard SWx interface. The UE 240A communicates with the LTE Network 402 via the LTE-Uu interface. The UE 240A receives service from a PDN 401 via a 3GPP standard SGi interface. The UE 240A accesses the internet 901 using a 3GPP standard SGi interface.

In one embodiment, the FWDN 120 at least comprises the eMAC 501, a LAN 125, an FWR 124, and a Wi-Fi Access Point (AP) 126. The AP 126 communicates with a UE 140A via an IEEE 802.11 standard Wi-Fi interface. In one embodiment, the eMAC 501 is an edge NE of the FWDN 120. The eMAC 501 communicates with the eMSG 510 via the I513. The eMAC 510 also communicates with the additional NE's within the FWDN 120 over the LAN 125 (e.g. the FWR 124 and the AP 126.) The eMAC 501 further communicates with an ESN 101 via a BNL 151 interface (hereinafter "I151").

In one embodiment, the eMUA 511 may access a public PDN, such as the Internet 901, via an IP interface 252A. The eMUA 511 may have a public IP address over the interface 252A since there is no NAPT NE employed on this interface. The eMAC 501 may access a public PDN, such as the Internet 901, via an IP interface 152 through the FWR 124. The FWR 124 may employ NAPT technologies to hide the private IP address that the eMAC 501 acquired from the ESN 101 without losing the capability for the eMAC 501 to exchange IP data packets with the Internet 901. The NAPT technology used by the FWR 124 also enhances the capability of the FWDN 120 to protect its NE's from hackers in the Internet 901. The eMAC 501 and the eMUA 511 communicate with each other via the I515 interface, which complies with an IP tunneling protocol, such as the GTP-U protocol. In one embodiment the I515 interface traverses the FWR 124 and the internet 901. The I515 interface is transparent to the FWR 124, thus alleviating reconfiguration of the FWR's 124 settings, while the eMAC 501 is deployed within the enterprise environment.

In one embodiment, the I515 interface uses a 3GPP standard GTP-U protocol as the IP tunneling protocol as a means of exchanging data between the eMUA 511 and the eMAC 501. The GTP-U tunneling protocol may also be used over the I514 interface between the eMUA 511 and the eMAC 501. Communications between the eMAC 501 and the UE 140A may use the 3GPP standard SWn interface over the Wi-Fi interface of the WLAN 125. In one embodiment, communications between the eMAC 501 and the eMUA 511 may use the I515 and/or the I514 interfaces based on control messages issued by the eMSG 510 over the I513 interface.

In one embodiment, the eMAC 501 may be configured to provide functions of a 3GPP standard ePDG (not shown.) Such functionality may include establishing an instance of the SWn interface with the UE 140A using an IKEv2/IPsec tunneling protocol. The eMAC 501 couples to an HSS (not shown) of the LTE Network 402 to authenticate establishment of the SWn interface instance. In an alternative embodiment, the eMAC 501 may use other tunneling protocol rather than defined by the 3GPP standard SWn interface to communicate with the UE 140A as long as the UE 140A has the capability to support the tunneling protocol. In any case, the connection between the eMAC 501 and the UE 140A is authenticated by the 3GPP AAA 525 server based on the user profile data acquired from the HSS (not shown.)

In one embodiment, the UE 140A, when in proximity of the FWDN 120, wirelessly transmits/receives information with the FWDN 120 using the Wi-Fi interface. Proximity of the FWDN 120 means within communication range of the Wi-Fi interface of an AP within the FWDN 120. In one embodiment, the AP 126 is configured to broadcast a Service Set Identifier (hereinafter "SSID") to announce the Wi-Fi interface's identity. The UE 140A receives the SSID and compares it with a list of preferred SSIDs stored in its internal memory. If the SSID is part of a preferred list of SSIDs, the UE 140A connects with the LAN 125, via the AP 126, after valid authentications are provided by the ESN 101.

Once the UE 140A authenticates with the LAN 125, applications stored on the UE 140A may establish one or more instances of the SWn interface in order to use services from the MWDN 220 and/or the FWDN 120. The eMAC 501 relays authentication information from the UE 140A application requests to the eMSG 510 via the I513 interface. The authentication requests are then passed to the 3GPP AAA 525 server via the SWm interface. The 3GPP AAA 525 server performs final authentication on the UE's 140A application requests based on user profile data retrieved from the HSS (not shown) of the LTE Network 402. If authentication is successful, the eMAC 501 establishes an instance of the SWn interface with the UE 140A. A method of establishing the SWn interface between the UE 140A and the eMAC 501 is further discussed below.

In one embodiment, the I513 interface does not involve NAPT technologies since the eMSG 510 and the eMAC 501 have direct visibility of the IP addresses of each other. Therefore, the eMSG 510 or the eMAC 501 may initiate an IP connection to reach the other without facing NAPT firewall issues. In one embodiment, the eMAC 501 obtains IP addresses from the MWDN 220 for the I513 and the I514 interfaces. The eMAC 501 may also obtain IP addresses from the FWDN 120 to receive local data access with the FWDN 120. The IP addresses acquired from the MWDN 220 are private to the MWDN and the IP addresses acquired from the FWDN 120 are private to the FWDN.

In one embodiment, the SWn interface uses an IPsec tunnel to transport user-plane data to/from the UE 140A. Encryption keys used by the IPsec tunnel are exchanged between the eMAC 501 and the UE 140A via a standard IKEv2 protocol. As a means of avoiding a pin-hole with the FWR 124, the following steps may be performed. First, the eMAC 501 extracts and encapsulates user-plane data from the SWn interface and forwards the data to the eMUA 511 via the GTP-U tunnel of the I515 and/or the I514 interfaces. The FWR 124 sees the GTP-U packets as standard legacy user data packets and allows the GTP-U packets to pass through without triggering a security alert. Such pass-through is allowed since the GTP-U tunnel runs on top of the standard internet User Datagram Protocol (hereinafter "UDP"). In one embodiment, the mobile device may be configured to establish two IPsec tunnels terminated at the eMAC. One IPsec tunnel carries one set of user-plane data, destined for the PDN 401, for mobile data services provided by the wireless carrier. The second IPsec tunnel carries a second set of user-plane data, destined for an ESN 101, for mobile data services provided by the enterprise. Since the two IPsec are independent, the UE 140A can simultaneously access mobile data services provided by both the wireless carrier and the enterprise. Although the two IPsec tunnels terminate at the eMAC 501, the two sets of the user-plane data (i.e., two SWn instances) are routed in different directions. The eMAC forwards the first set of user-plane data, extracted from the first SWn instance, to the PDN 401 via the interface I515. The eMAC 501 forwards the second set of user-plane data, extracted from the second SWn instance, to the ESN 101 via the LAN 125.

In one embodiment, the eMSG 510 provides the control-plane information to both the eMUA 511 and the eMAC 501 in order to establish the GTP-U tunnel across the I515 and/or the I514 interfaces. The control-plane information at least comprise IP addresses for the eMUA 511 and a Tunnel End Identifier (hereinafter "TEID") for each of the GTP-U tunnels. In one embodiment, it may be beneficial to keep the GTP-U tunnels across the I515 interface transparent to the NAPT function of the FWR 124. To maintain tunnel transparency, the eMSG 510 manages establishment of the GTP-U. First, the eMAC 501 requests establishment of an IP tunnel to the eMUA 511, wherein the request is made to the eMSG 510 via the I513. Next, the eMSG 510 provides (via the I513) the eMAC 501 with the IP address of the eMUA 511. Then the eMAC 501 initiates the IP tunnel, using the eMUA's 511 IP address as the tunnel destination. After receiving IP packets from the eMAC 501 (via the FWR 124), the eMUA 511 may use the source IP address and port of the UDP data packet (received from the FWR 124) to communicate the user-plane data from the PDN 401 back to the eMAC 501. This approach achieves NAPT traversal over the FWR 124 for bilateral communications between the UE 140A and the PDN 401. However, both the eMSG 511 and the eMAC 501 may use the TEID's, communicated by the eMSG 510, to identify the IP tunnel that is established between the eMUA 511 and the eMAC 501.

Figure 5B:
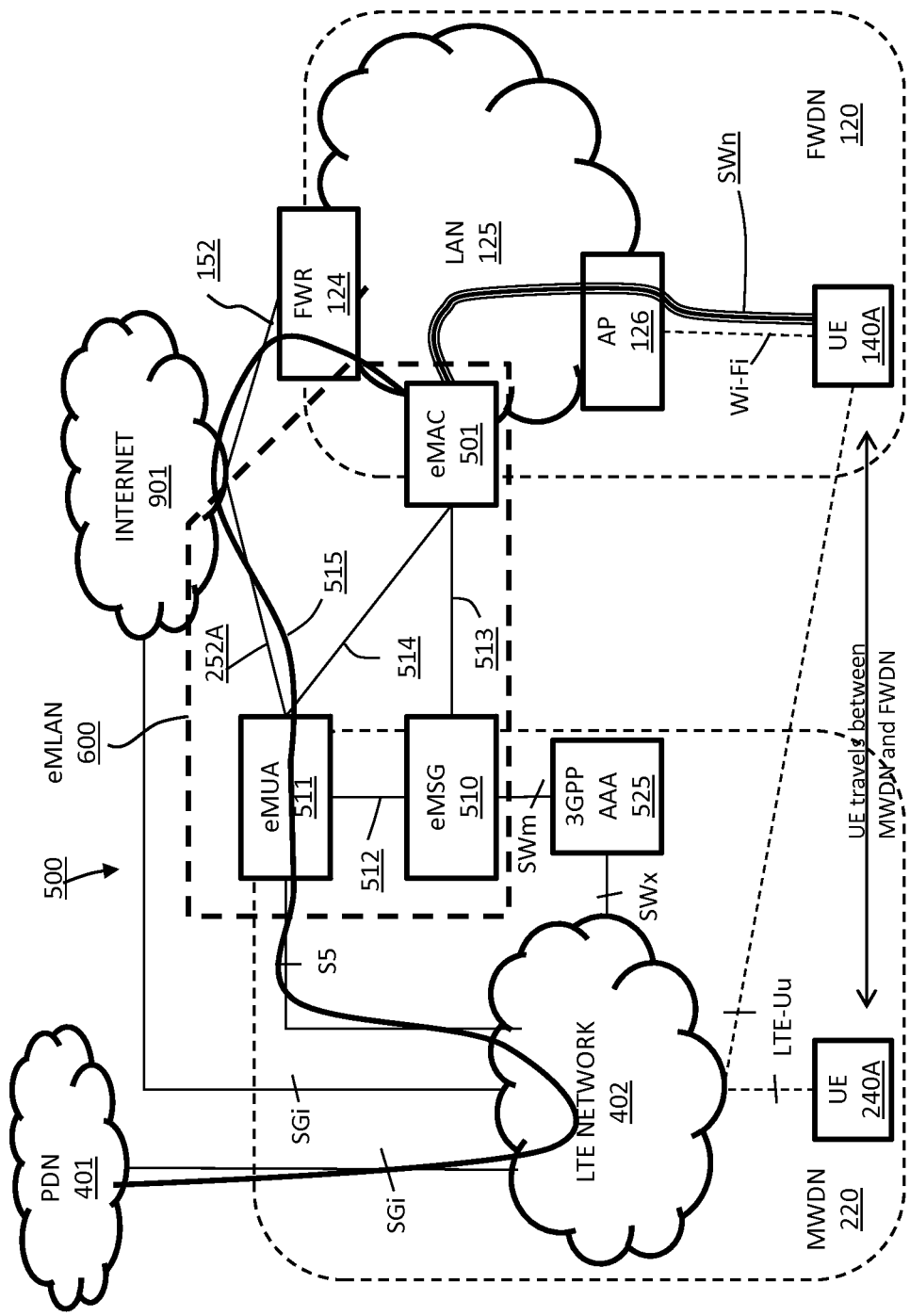
FIG. 5B illustrates another embodiment of a network architecture and a plurality of communication flows between various components within the architecture

FIG. 5B illustrates another embodiment of a network architecture and a plurality of communication flows between various components within the architecture. The network architecture 500 of FIG. 5B maintains the same network elements and components as FIG. 5A. However, the communication flows between the components differ. For clarity of description, a GTP tunneling protocol is used as an example for IP tunneling over the S5 interface in the following paragraphs. In this embodiment, the eMUA 511 of the eMLAN 600 is capable of communication with the LTE Network 402 via an instance of the S5 interface. In one embodiment, after a GTP-U instance of the S5 interface is established, the eMUA 511 connects the GTP-U tunnel of the S5 interface with the GTP-U tunnel of the I515 interface. Once this connection is established, the eMUA 511 may transport mobile data packets of the UE 140A via the eMAC 501 to the LTE network

402. This connection allows the LTE Network 402 to deliver LTE services (e.g., PDN 401) to the UE 140A, while the UE 140A is within and connected with the FWDN 120, without using an LTE-Uu interface of the MWDN 220. Further, although the I515 interface is realized (over the BNL 252A, the internet 901, the BNL 152, the FWR 124 and the LAN 125), the I515 interface may be delivered over the I514. The choice of IP routes for the I515 is managed by the eMSG 510, whose control messages are exchanged with the eMUA 511 via I512 and the eMAC 501 via the I513, respectively.

Figure 6A:
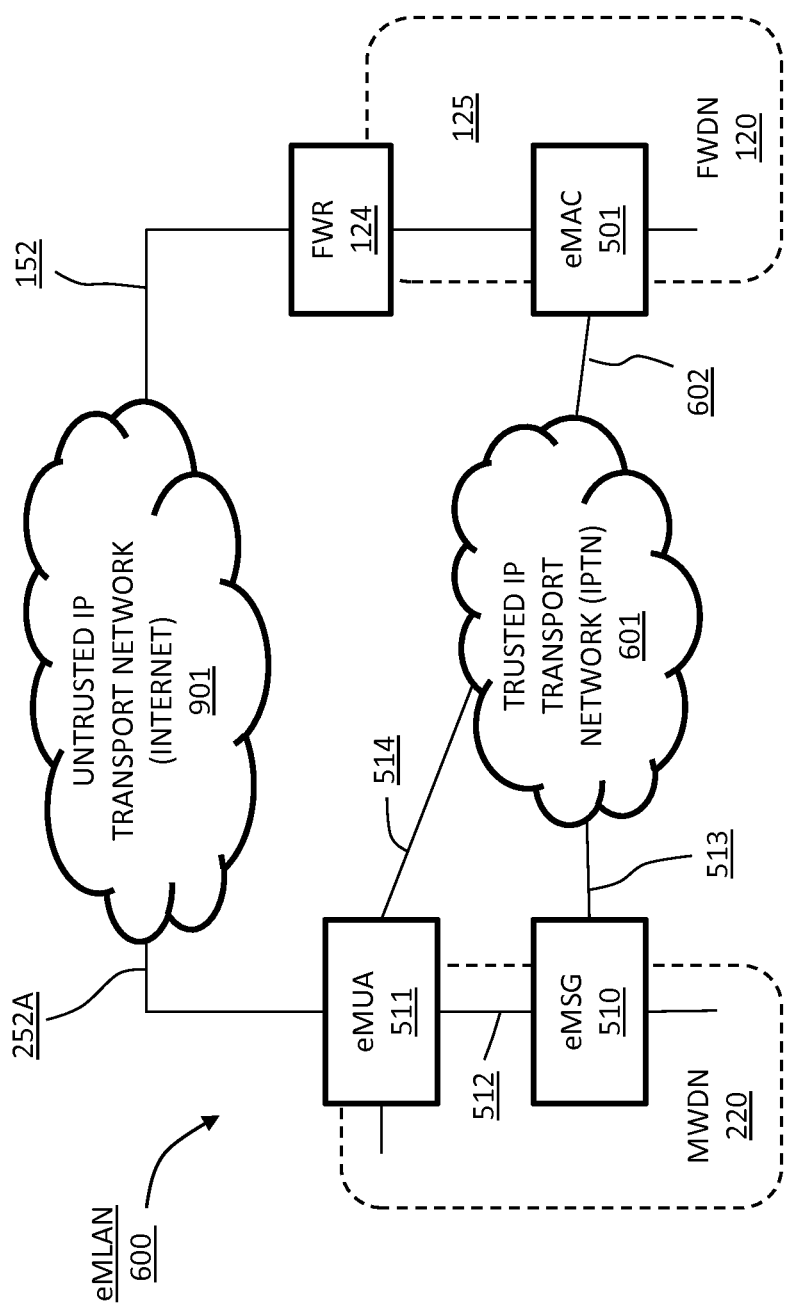
FIG. 6A illustrates an embodiment of a network architecture of an eMLAN.

FIG. 6A illustrates an embodiment of network architecture of an eMLAN. The eMLAN 600 comprises one or more eMAC's 501, one or more eMUA's 511, and one or more eMSG's 510. The eMSG 510 and the eMUA 511 reside in an MWDN 220, while the eMAC 501 resides in an FWDN 120. The eMUA 511 couples (i.e., interfaces 252A and 152) to the eMAC 501 via an untrusted IP transport network (hereinafter "IPTN") 901 (e.g., the internet). Further, the eMUA 511 may couple (i.e., interfaces 514 and 602) to the eMAC 501 via a trusted IPTN 601. In one embodiment, the eMSG 510 couples (i.e., interfaces 513 and 602) to the eMAC 501 via the trusted IPTN 601. An FWR 124, resident in the FWDN 120, protects access to the connection 152 from the untrusted IPTN 901.

In one embodiment, a trusted network may be defined as a network comprising a communication path between two or more network elements wherein data communicated between to the two or more network elements is not at risk of being intercepted and/or manipulated by unauthorized parties. Alternatively, an untrusted network may be defined as a network comprising two or more network elements wherein data communicated between the two or more network elements does not require authorization to access the data. In one embodiment, the Internet is an example of an untrusted network. In yet another embodiment, a firewall may be designed to block unauthorized access to a network while permitting authorized communications. In one embodiment, a firewall may be position between an enterprise network and the internet as a means of protecting the enterprise network from being hacked and/or against malicious attacks originating from the internet. The firewall is configured to filter out the data sent by attackers. The firewall may further use a network address and NAPT services to reduce the visibility of IP addresses and ports of network elements; as well as user devices, within the enterprise network, attempting to access the internet. In one embodiment, this is accomplished by opening a minimal number of IP addresses and ports towards the internet. The firewall further permits the network elements and user devices to share the limited number of IP addresses and port numbers for access to the internet.

Figure 6B:
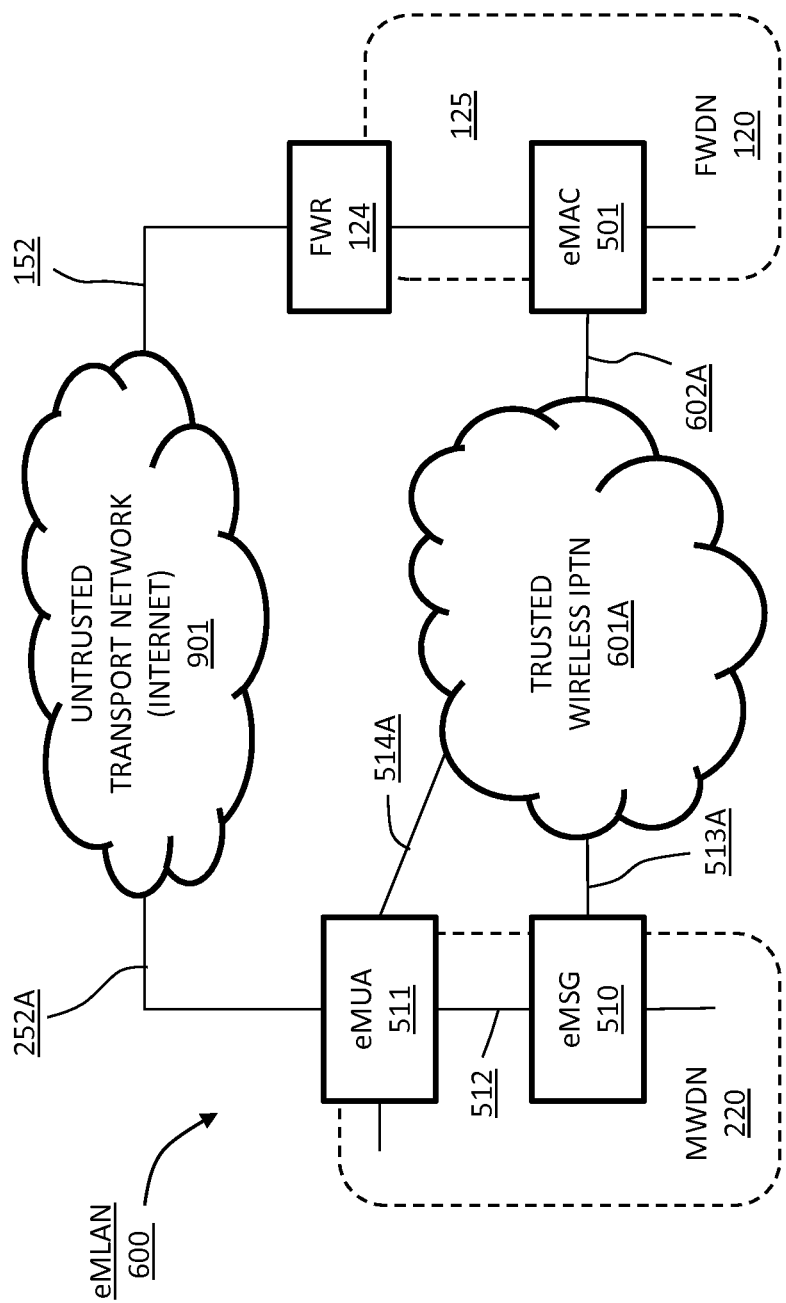
FIG. 6B illustrates another embodiment of network architecture of an eMLAN.

FIG. 6B illustrates another embodiment of network architecture of an eMLAN. The network element and components of FIG. 6B provide for the same components as FIG. 6A with varied transport networks. In the present embodiment, the eMUA 511 couples (i.e., interfaces 514A and 602A) to the eMAC 501 through a Trusted Wireless IPTN 601A. The eMSG 510 couples (i.e., interfaces 513A and 602A) to the eMAC 501 via the IPTN 601A. The connection 602A is a trusted and secured interface. In one embodiment, the eMAC 501 communicates with the IPTN 601A by using a standard compliant wireless data modem card (hereinafter "WDC").

The IPTN 601A provides secure point-to-point IP connection between both the eMSG 510 and the eMAC 501 and between the eMUA 511 and the eMAC 501. The secure wireless IP connection (e.g., interfaces 513A, 514A and 602A) allows the eMSG 510 to bypass the FWR 124 and directly communicate with the eMAC 501. In one embodiment, the eMSG 510 authenticates and establishes the secure wireless IP connections. In another embodiment, the WDC within the eMAC 501 is authenticated by the IPTN 601A before the eMSG 510 establishes the secure connection 602A. In another embodiment, the WDC is securely coupled, physically and electronically, to the eMAC 501. For example, the WDC may physically reside within the eMAC 501. In another embodiment, the eMSG 510 and the eMAC 501 may use an Extensible Authentication Protocol (hereinafter "EAP") and a digital certificate to mutually authenticate.

Figure 6C:
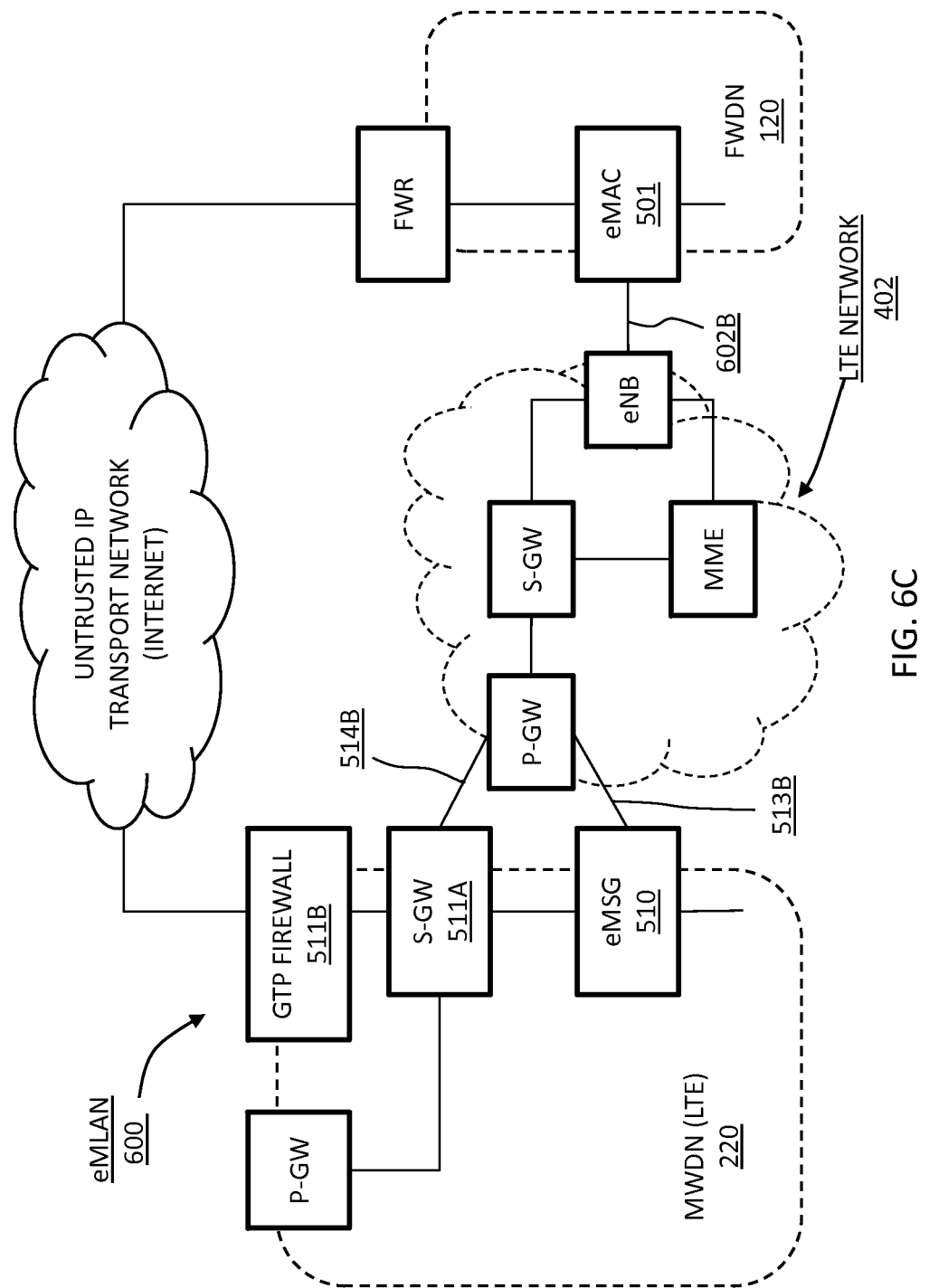
FIG. 6C illustrates another embodiment of network architecture of an eMLAN.

FIG. 6C illustrates another embodiment of a network architecture of an eMLAN. In this embodiment, the eMLAN 600 comprises a 3GPP LTE Network 402 employed as part of a MWDN 220. Further, a trusted wireless IPTN exists to provide IP connections between the MWDN 220 and the FWDN 120. An eMUA exists as a combination of an S-GW 511A and a GTP Firewall 511B. The LTE Network 402 may also serve as the trusted wireless IP transport network for private connections between 1) the S-GW 511A (serving as an eMUA) and the eMAC 501; and 2) between the eMSG 510 and the eMAC 501. The LTE Network 402 may assign different Access Point Names (hereinafter "APN") for the interfaces 513B and 514B. The eMAC 501 employs an LTE modem card (e.g., physical card) to obtain mobile broadband data service over an LTE air interface 602B. The LTE modem card provides a secure over-the-air interface 602B based on LTE specifications. In one embodiment, the LTE Network 402 may belong to the same wireless carrier who owns the LTE MWDN 220. Common ownership allows for trust between the two entities.

Figure 6D:
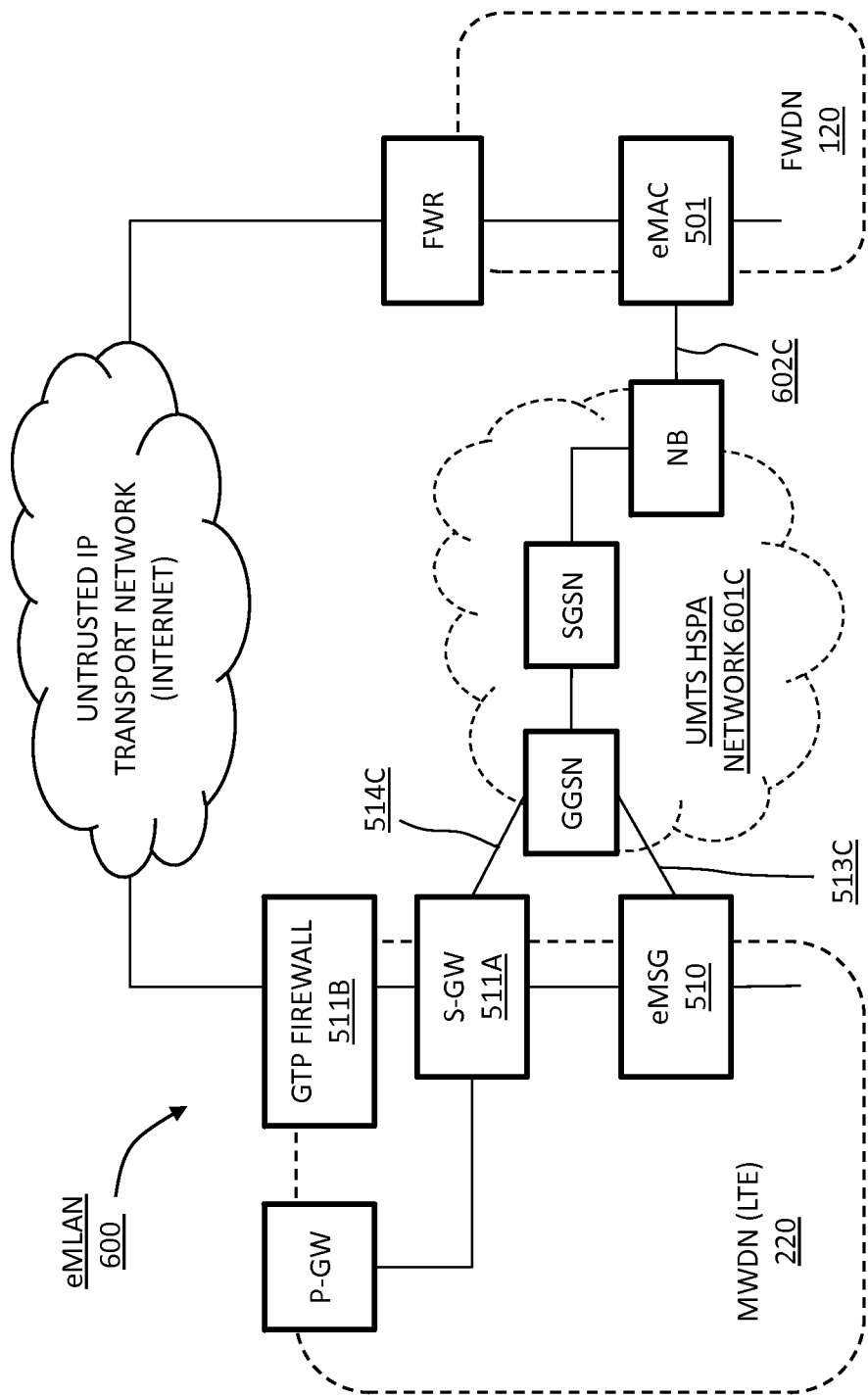
FIG. 6D illustrates another embodiment of network architecture of an eMLAN.

FIG. 6D illustrates another embodiment of a network architecture of an eMLAN. In this embodiment, the eMLAN 600 comprises a Universal Mobile Telecommunications Service High Speed Packet Access Network (hereinafter "3GPP UMTS HSPA") 601C employed as a trusted wireless IPTN to provide IP connections between the MWDN 220 and the FWDN 120. An eMUA 511 exists as a combination of an S-GW 511A and a GTP Firewall 511B. The Network 601C serves as the trusted wireless IPTN for private connections between 1) the S-GW 511A (serving as an eMUA) and the eMAC 501; and 2) between the eMSG 510 and the eMAC 501. The Network 601C may assign different APN's for the interfaces 513C and 514C. The eMAC 501 employs an HSPA modem card (e.g., physical card) to obtain mobile broadband data service over a UMTS air interface 602C. The said HSPA modem card provides a secure over-the-air interface 602C according to the 3GPP HSPA specifications. In one embodiment, the HSPA Network 601C may belong to the same wireless carrier who owns the LTE MWDN 220. Common ownership allows for trust between the two entities.

Figure 6E:
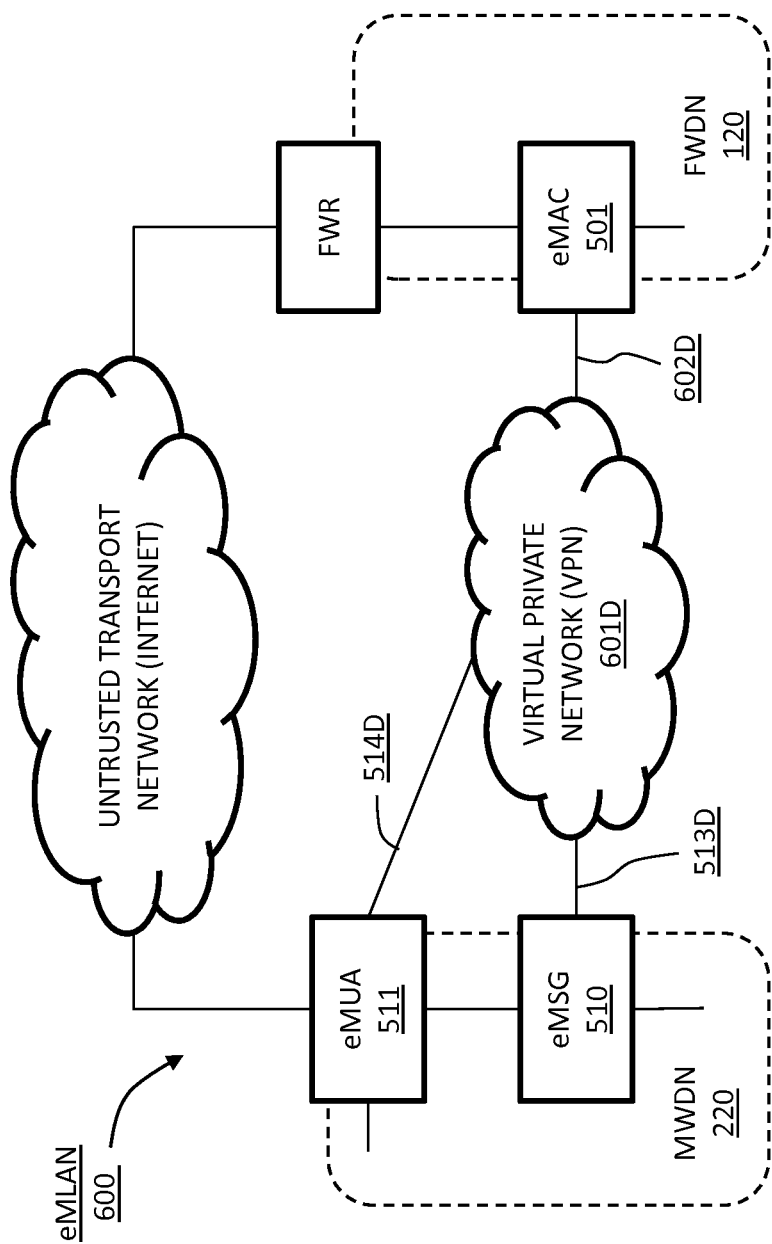
FIG. 6E illustrates another embodiment of network architecture of an eMLAN.

FIG. 6E illustrates another embodiment of a network architecture of an eMLAN. The eMLAN 600 comprises a Virtual Private Network ("hereinafter "VPN") 601D employed as a trusted IPTN to provide IP connections between the MWDN 220 and the FWDN 120. The VPN 601D provides 1) a trusted IP transport connection 514D between the eMUA 511 and the eMAC 501; and 2) a trusted IP transport connection 513D between the eMSG 510 and the eMAC 501. The eMAC 501 employs a private and secure interface 602D to communicate with the VPN 601D. In one embodiment, the VPN 601D may belong to the same wireless carrier who owns the LTE MWDN 220. Common ownership allows for trust between the two entities. In another embodiment, the VPN 601D may be realized through a secured web portal using Hypertext Transfer Protocol Secure (hereinafter, "HTTPS") protocol.

Figure 7:
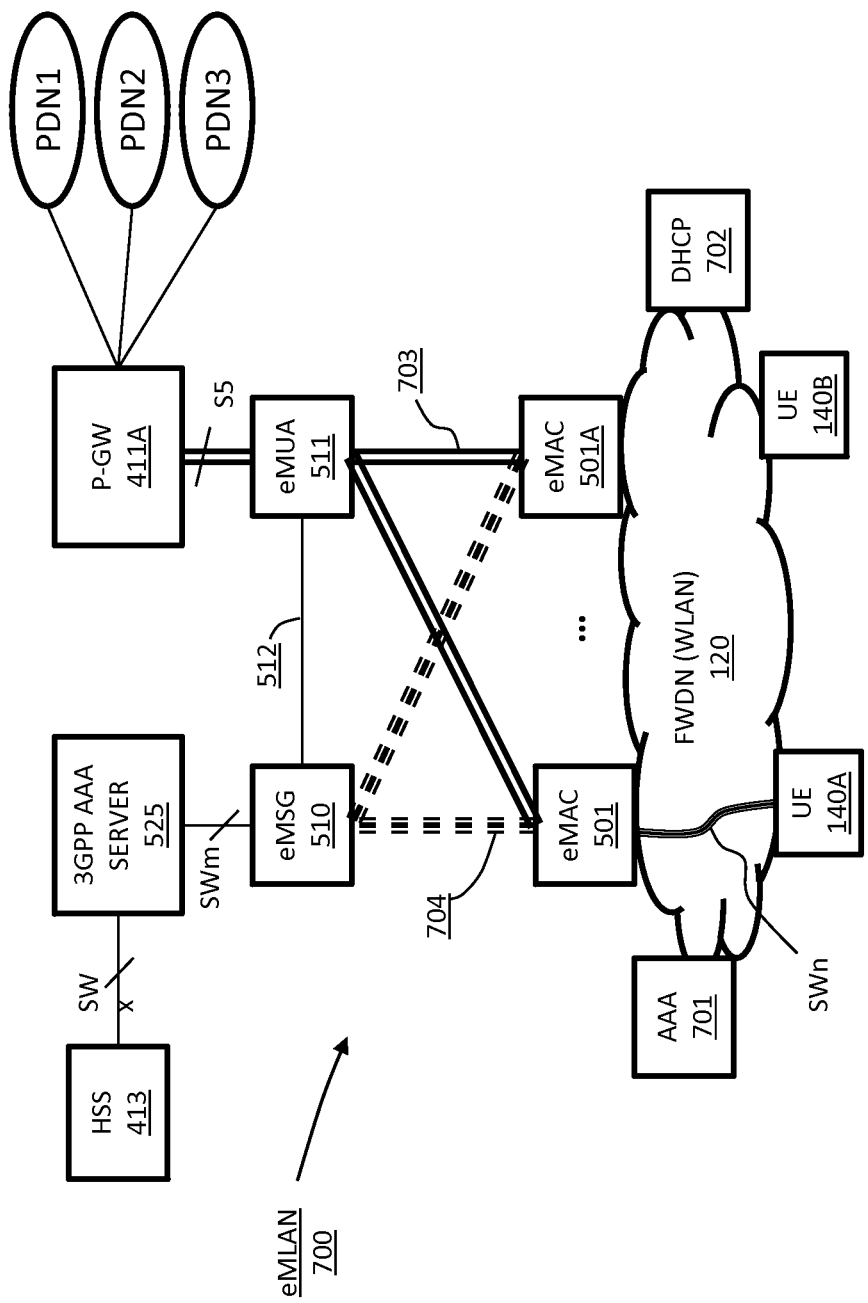
FIG. 7 illustrates an embodiment of network architecture of an eMLAN.
Figure 8A:
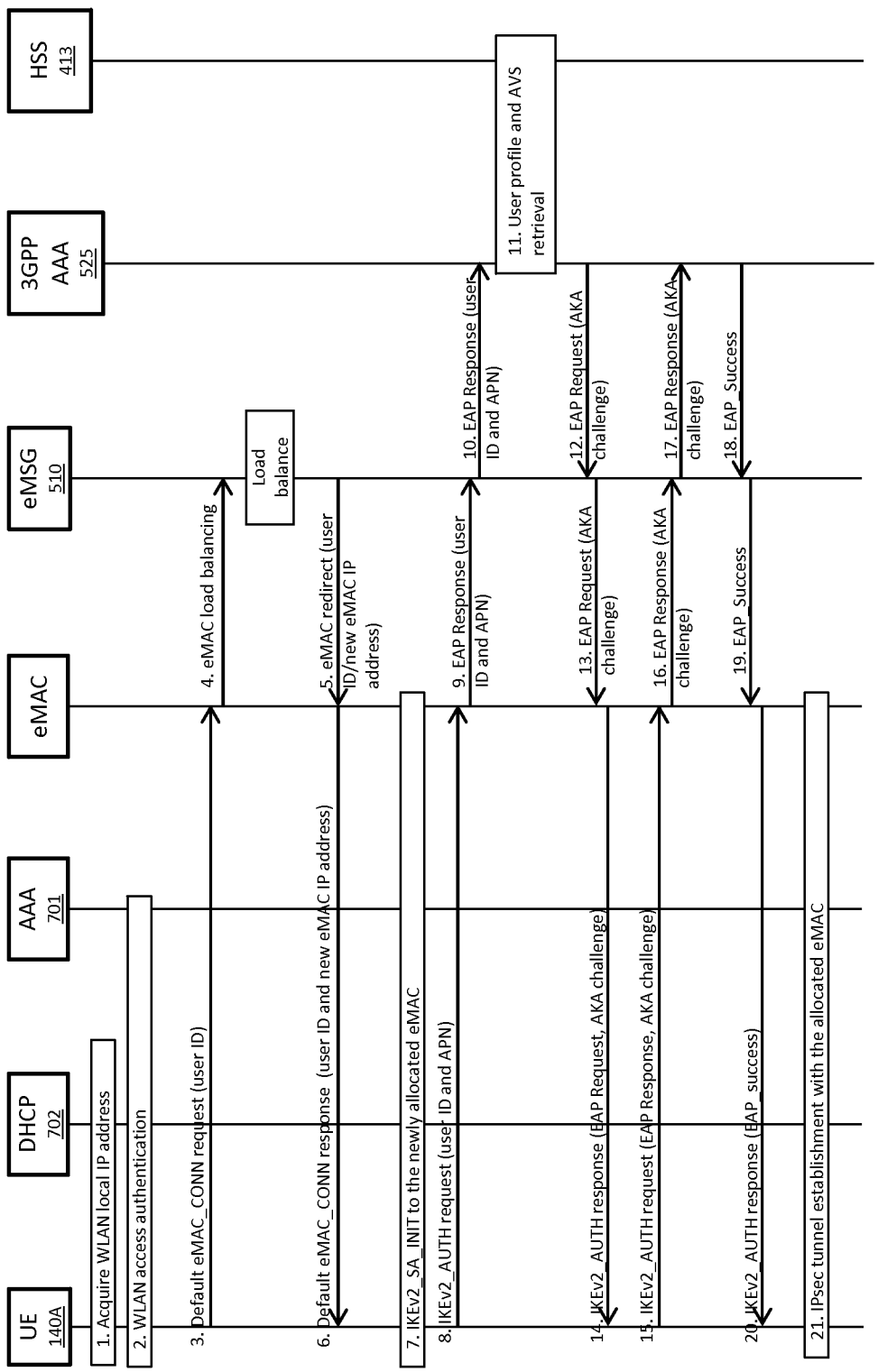
FIG. 8A illustrates a flow diagram of a method for authenticating and network load balancing a mobile data service over a WLAN.

FIGS. 7 and 8A illustrate an embodiment of network architecture of an eMLAN, as well as a flow diagram for a method of authenticating and network load balancing a mobile data service over a WLAN. The eMLAN 700 comprises multiple eMACs 501 and 501A, an eMSG 510 and an eMUA 511. The eMSG 510 manages a plurality of UE's 140A and 140B that may connect to a single eMAC based on the load placed on the eMAC. The load balance process may be included in an authentication process for the establishment of a standard SWn interface. The follow steps describe a process for authenticating the SWn interface establishment and the load balancing amongst the eMAC's 501 and 501A.

In a connecting step (step 1) a mobile device UE 140A connects with a FWDN 120 over a Wi-Fi interface and acquires a local IP address from the FWDN 120 via a Dynamic Host Configuration Protocol (hereinafter "DHCP") server 702. In an authenticating step (step 2), the UE 140A authenticates against the WLAN via a local AAA 701 server and establishes IP connectivity with the FWDN 120, once authentication is verified. In a requesting step (step 3), the UE 140A sends an eMAC connection request (hereinafter "eMAC_CONN") to the default eMAC 501. The request may be stored in the UE's 140A internal memory from either a prior access history or from a manual addition made by a user.

In a requesting step (step 4), the default eMAC 501 also sends a connection request to the eMSG 510 after receipt of the eMAC_CONN request. The eMSG 510 tracks the number of UE's, or mobile devices, connected to each eMAC and balances the load of each eMAC by routing each eMAC_CONN request to a proper eMAC within the network. In one embodiment, each eMAC_CONN request is routed to the eMAC with the lightest load. In a redirecting step (step 5), the eMSG 510 replies to the eMAC 501 who received the eMAC_CONN request with the IP address of the selected eMAC 501A. The request is redirected from the UE 140A. In a forwarding step (step 6), the default eMAC 501 forwards the IP address of the selected eMAC 501A to the UE 140A.

In a transmitting step (step 7), the UE 140A transmits an IKEv2_SA_INIT message to the chosen eMAC 501A to secure exchange of the IKEv2_AUTH messages. In a transmitting step (step 8), the UE 140A further transmits an IKEv2_AUTH request to the selected eMAC 501A. In a transmitting step (step 9), the selected eMAC 501A transmits an EAP response message to the eMSG 510.

In a forwarding step (step 10), the eMSG 510 forwards the EAP response message from the selected eMAC 501A to the 3GPP AAA server 525 in order to authenticate the UE 140A. In a retrieval step (step 11), the 3GPP AAA server 525 retrieves the UE 140A subscription profile data from an HSS 413. In a generating step (step 12), the 3GPP AAA server 525 generates an 3GPP standard Authentication and Key Agreement (hereinafter "AKA") challenge based on received user profile data and forwards the AKA challenge to the eMSG 510.

In a forwarding step (step 13), the eMSG 510 further forwards the AKA challenge to the selected eMAC 501A. In a relaying step (step 14), the selected eMAC 501A relays the AKA challenge to the UE 140A. The UE 140A uses the AKA challenge to authenticate. In a replying step (step 15), the UE 140A replies to the selected eMAC 501A, by transmitting a new AKA challenge in order to verify legitimacy of the 3GPP AAA server 525.

In a forwarding step (step 16), the selected eMAC 501A forwards the UE generated AKA challenge to the eMSG 510. In another forwarding step (step 17), the eMSG 510 forwards the UE generated AKA challenge to the 3GPP AAA server 525. In an issuing step (step 18), the 3GPP AAA server 525 issues an EAP_success message to the eMSG 510, provided authentication is positive.

In a forwarding step (step 19), the eMSG 510 forwards the EAP_success message to the selected eMAC 501A to confirm the positive authentication. In a transmitting step (step 20), the selected eMAC 501A transmits the EAP_success message to the UE 140A, which completes the mutual authentication between the UE 140A and the 3GPP AAA server 525. Finally, in an establishing step (step 21), the UE 140A and the selected eMAC 501A establish an IPsec tunnel using the encryption keys exchanged during the authentication process. Lastly, the IPsec tunnel activates an instance of the 3GPP standard SWn interface between the UE 140A and the selected eMAC 501A.

Figure 8B:
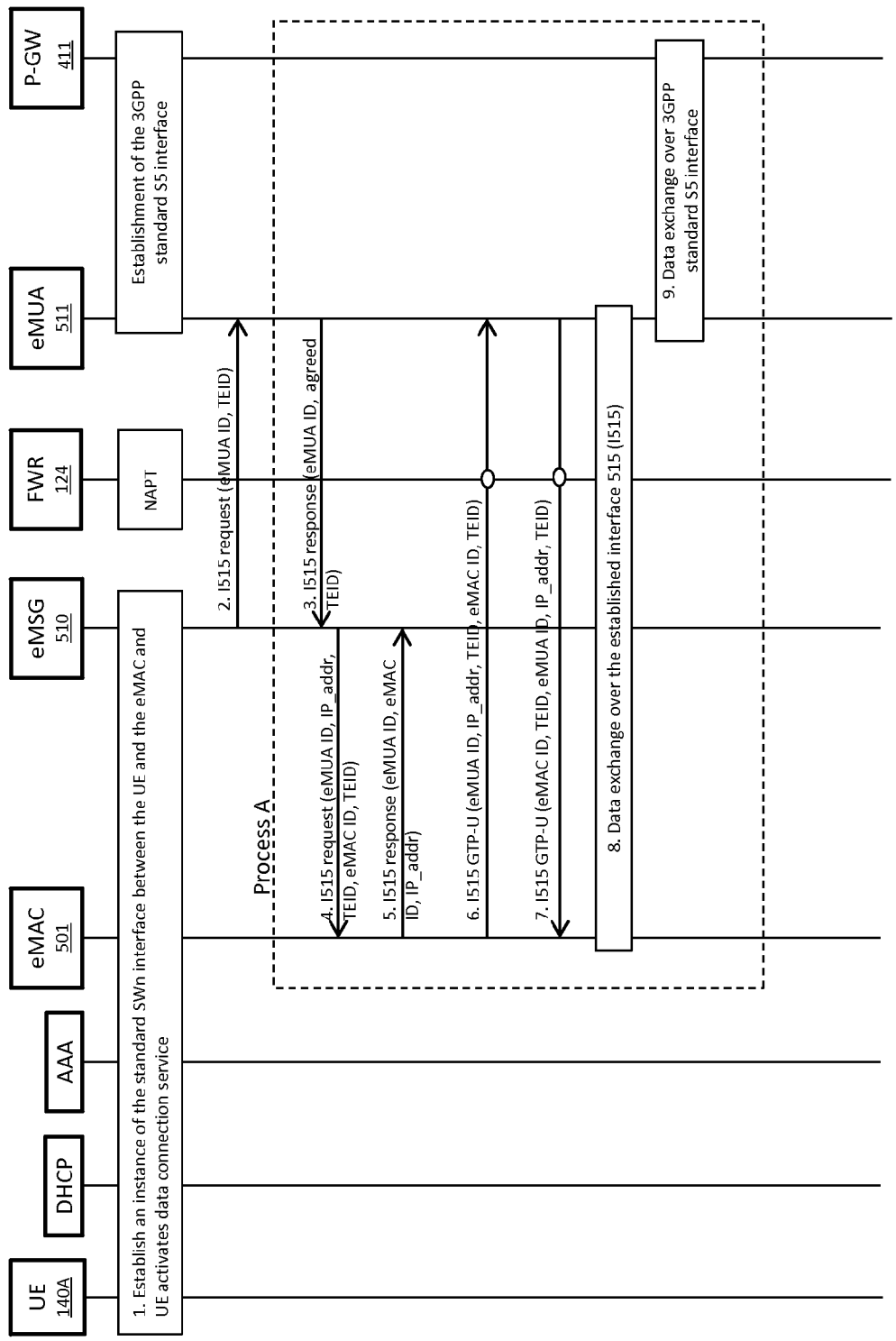
FIG. 8B illustrates a flow diagram describing one embodiment for exchanging message processes, initiated by a mobile device, between an eMAC and an eMUA to establish the user-plane over a public (untrusted) IP transport network.

FIG. 8B illustrates a flow diagram describing one embodiment for exchanging message processes, initiated by a mobile device, between an eMAC and an eMUA to establish the user-plane over a public (untrusted) IPTN. In one embodiment, an interface is used for communicating the user-plane, via a standard GTP-U tunnel, over a public (untrusted) IPTN. Once a UE 140A initiates an MWDN (LTE network) service request, the following steps may be executed by the network architecture illustrated in FIG. 5A.

In an establishing step (step 1), the UE 140A from FIG. 5 establishes an instance of the SWn interface with the eMAC 501 under the management of the eMSG 510 following the process described in FIG. 8. The eMUA 511 establishes an instance of the standard S5 interface with a P-GW 411 of the LTE Network 402. In a requesting step (step 2), the eMSG 510 sends an I515 interface request to the eMUA 511 over the I512 interface via an intranet of the MWDN 220 to establish the I515 interface between the eMUA 511 and the eMAC 501 (via the Internet.) The I515 and I512 interfaces are the same I515 and I512 interfaces as described in FIG. 5A. The request message may include a candidate TEID of the GTP-U tunnel terminated at the eMUA 511. In a relaying step (step 3), the eMUA 511 determines if a different TEID may be used. If a different TEID is to be used, the eMUA 511 relays a new TEID (hereinafter "new TEID") to the eMSG 510.

In a verifying step (step 4), the eMSG 510 verifies the new TEID and updates a data base with the new TEID. The eMSG 510 further transmits the I515 interface request, along with information elements, to the eMAC 501. In one embodiment, the information elements may include an eMUA ID, an IP address, the new TEID, an eMAC ID, and a TEID of the GTP-U tunnel at the eMAC side. In a responding step (step 5), the eMAC 501 respond to the received I515 interface request (including the information elements) by sending a confirmation to the eMSG 510. The eMSG 510 updates its database upon receipt of the confirmation.

In a constructing step (step 6), the eMAC 501 constructs the I515 interface's GTP-U tunnel. Construction of the GTP-U tunnels takes the received information into consideration. The information elements may comprise an eMUA ID, an eMUA IP address, an eMUA TEID, an eMAC ID, an eMAC TEID, and an eMAC IP address. In one embodiment, the eMAC 501 uses the FWDN's 120 local IP address as the source IP address and the eMUA's 511 IP address as the destination address for the UDP transport of the GTP-U tunnel. The eMUA 511 IP address is public and therefore internet routable. However, the source IP address of the UDP transport packets, used by the eMAC, is local and private to the FWDN, therefore, not internet routable. In order to permit the source IP address to become internet-routable, the firewall FWR 124 performs NAPT and replaces the source IP address with the network IP address of the FWDN 120, before the GTP-U data packets are communicated to the eMUA 511.

In an establishing step (step 7), the eMUA 511 establishes the returning GTP-U tunnel of the I515 interface by using the source IP address of the UDP transport of the GTP-U packet received. In one embodiment, the returning path is transparent to the FWR 124 since initiation of the path originated from the eMAC 501, behind the FWR 124. In an establishing step (step 8), both the eMAC 501 and the eMUA 511 establish an instance of the I515 interface. Data exchange between the eMAC 501 and the eMUA 511 is permitted by the FWR 124. In an activation step (step 9), the eMUA 511 activates the standard S5 interface to the LTE network, which completes the point-to-point IP connection between the UE 140A and the P-GW 411 of the LTE network 402.

Figure 8C:
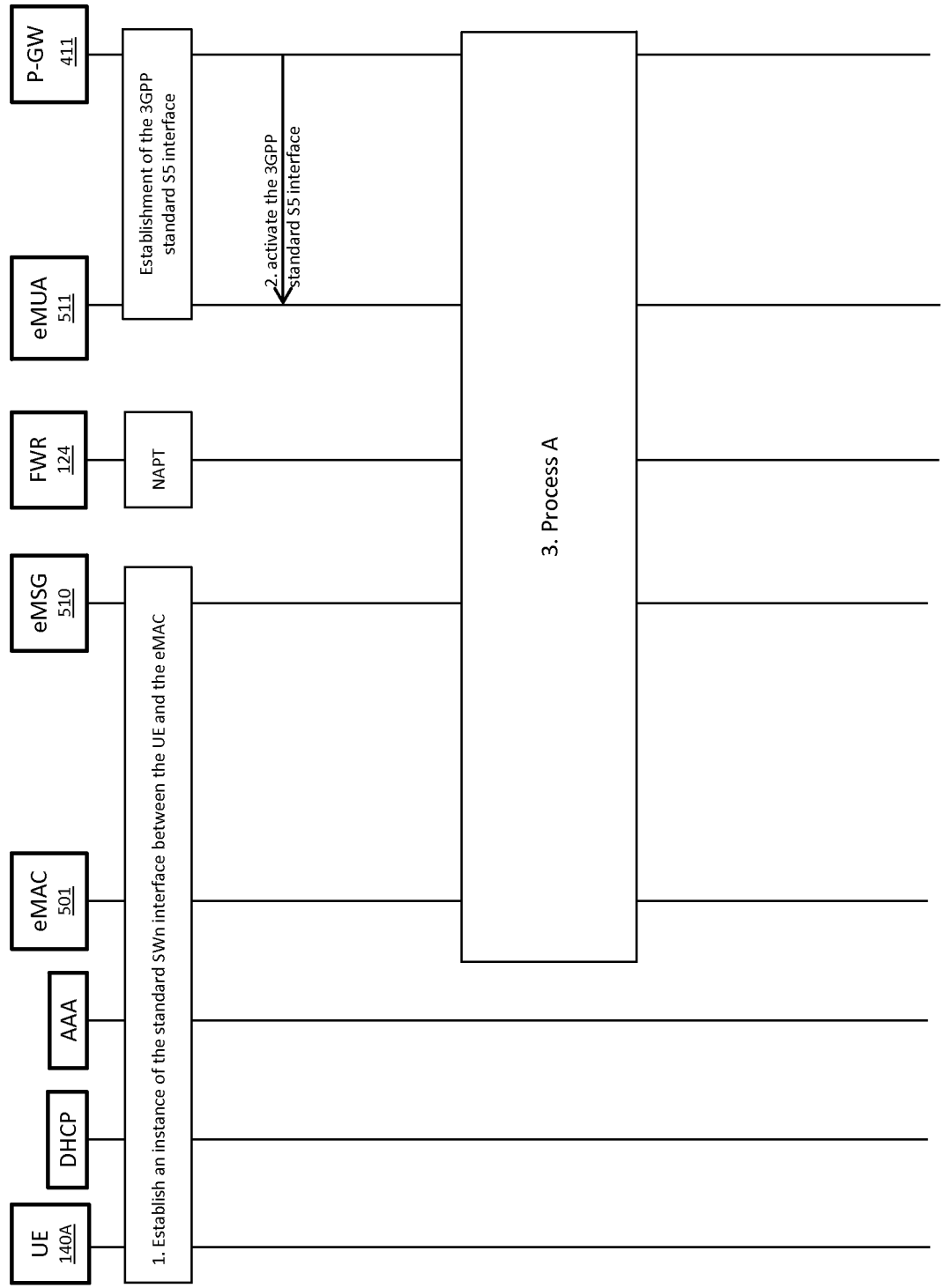
FIG. 8C illustrates a flow diagram describing another embodiment for exchanging message processes, initiated by a mobile network, between an eMAC and an eMUA to establish the user-plane over a public (untrusted) IP transport network.

FIG. 8C illustrates a flow diagram describing another embodiment for exchanging message processes, initiated by a mobile network, between an eMAC and an eMUA to establish the user-plane over a public (untrusted) IPTN. In this embodiment, it is assumed that the LTE network 402 initiates a MWDN service request. In an establishment step (step 1) the UE 140A establishes an instance of the SWn interface with the eMAC 501 under the management of the eMSG 510. The eMUA 511 establishes an instance of the standard S5 interface to a P-GW 411 of the LTE Network 402. In a requesting step (step 2), the P-GW 411 requests that the eMUA 511 activate the standard S5 interface between them. In a processing step (step 3), upon receipt of the S5 interface activation request, the eMUA 511 initiates the steps (hereinafter "Process A") described above with respect to FIG. 8A.

Figure 9:
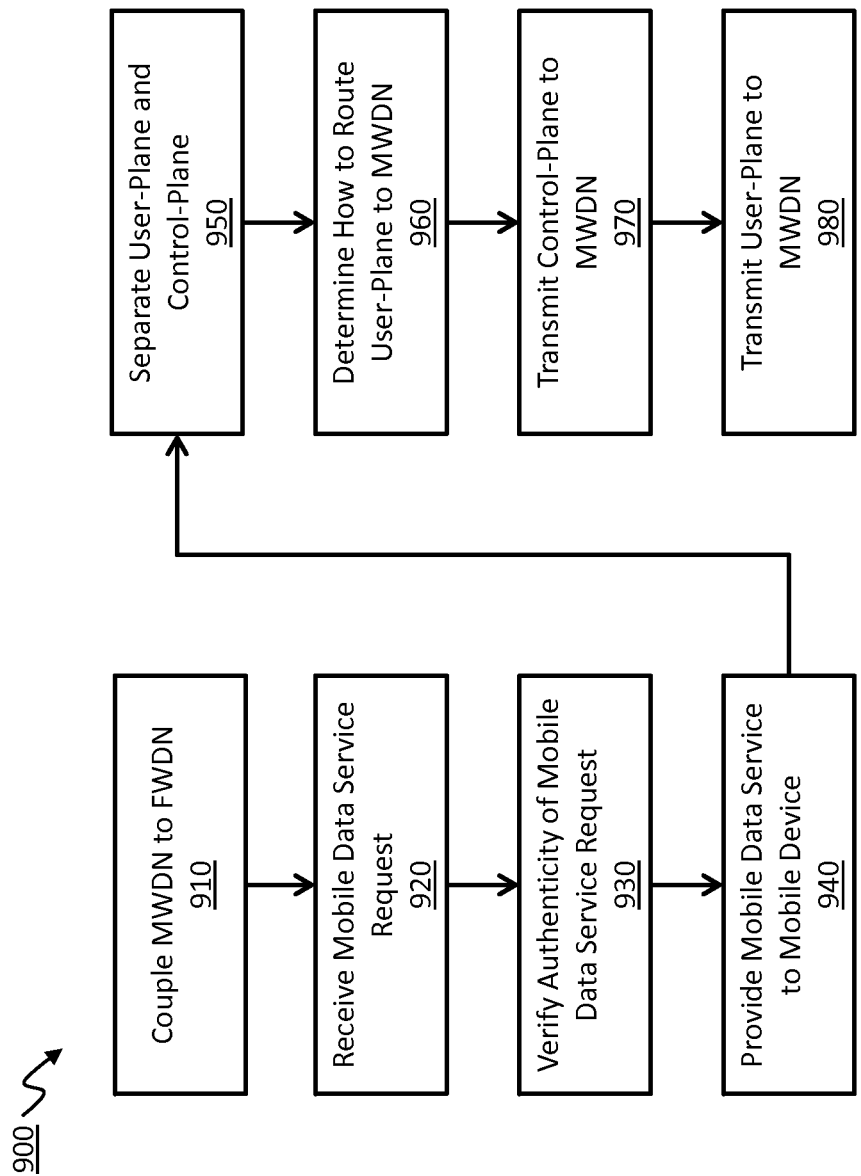
FIG. 9 illustrates a flow diagram describing one embodiment for providing mobile data service, initiated by a mobile device, to a mobile device over an FWDN.

FIG. 9 illustrates a flow diagram 900 describing one embodiment for providing mobile data service to a mobile device over a FWDN, wherein the mobile device initiates the mobile data service request. In a coupling step 910, an MWDN is coupled to an FWDN via an IPTN. In a receiving step 920, a mobile data service request is received via the FWDN. In a verifying step 930, the authenticity of the mobile data service request is verified. In one embodiment, the MWDN is configured to authenticate the service request and communicate the result to the eMAC. In a delivering step 940, mobile data service is provided to the mobile device. In one embodiment, the service is provided via the FWDN. In another embodiment, the mobile device transparently communicates with the MWDN via the FWDN.

In a separating step 950, a user-plane data and a control-plane data is received from the mobile data service request and separated into two distinct data streams. In a determination step 960, a determination is made as to whether the user-plane data is communicated to the MWDN over a trusted IPTN, an untrusted IPTN or directly with an IPTN. In a transmission step 970, the control-plane is transmitted to the MWDN via a first trusted IPTN, without passing through a firewall. In another transmission step 980, the user-plane data is transmitted to the MWDN via an untrusted IPTM. In one embodiment, the user-plane data passes through a firewall, untouched. In an optional step (not shown), step 980 is replaced with transmitting the user-plane data to the MWDN via a second trusted IPTN, wherein the user-plane data does not pass through a firewall.

Figure 10:
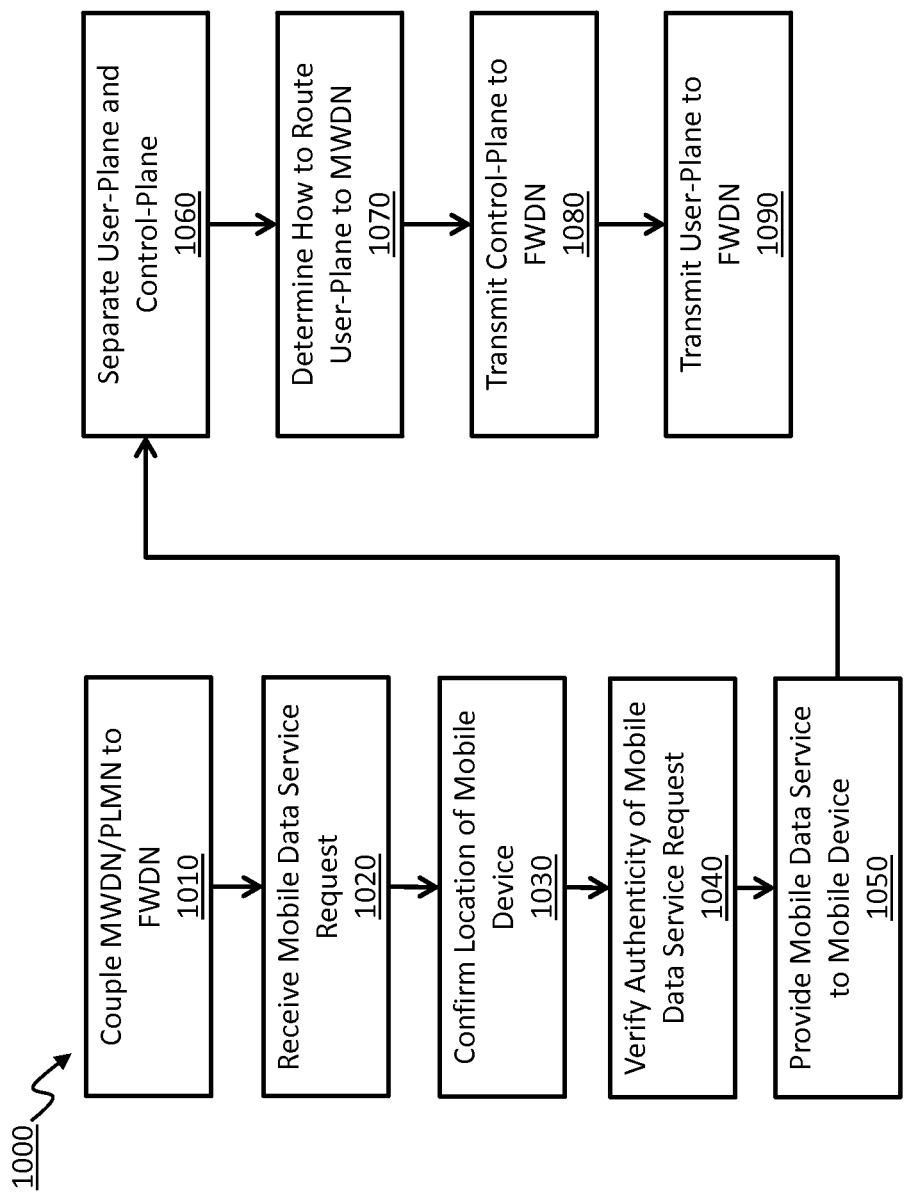
FIG. 10 illustrates a flow diagram describing another embodiment for providing mobile data service, initiated by a PLMN, to a mobile device over an FWDN.

FIG. 10 illustrates a flow diagram 1000 describing another embodiment for providing mobile data service, initiated by a PLMN, to a mobile device over a FWDN. In coupling step 1010 an MWDN is coupled to an FWDN via a first, second, and third IPTN connection. Further, the MWDN is coupled to the PLMN via a fourth IPTN connection. In a receiving step 1020, a mobile data service request is received from the PLMN. In one embodiment, the mobile data service request is received from an MSN located within the PLMN. In a confirmation step 1030, a confirmation is made that a mobile device associated with the mobile data service request is located within and communicatively coupled to the FWDN.

In one embodiment, such confirmation is made by intercepting registration and location information coming from the mobile device. In a verifying step 1040, the authenticity of the mobile data service request is verified. In one embodiment, the MWDN is configured to authenticate the service request and communicate the result to the eMAC. In a delivering step 1050, mobile data service is provided to the mobile device. In one embodiment, the service is provided via the MWDN and the FWDN. In another embodiment, the mobile device transparently communicates with the PLMN via the FWDN and the MWDN.

In a separating step 1060, a user-plane data and a control-plane data is received from the mobile data service request and separated into two distinct data streams. In a determination step 1070, a determination is made as to whether the user-plane data is communicated to the FWDN over a trusted or untrusted IPTN. In a transmission step 1080, the control-plane data is transmitted to the FWDN over the first IPTN, wherein the first IPTN is a trusted network. Lastly, in a delivery step 1090, the user-plane data is provided to the mobile device via the trusted or untrusted IPTN.

In one embodiment, additional steps for completing the confirmation step 1030 are now described. First, a query for identifying the location of the mobile device associated with the mobile data service request is sent from the MWDN to the mobile device via the first IPTN wherein the first IPTN is a trusted wireless network. Next, the mobile device responds to the query wherein the response contains location information of the mobile device within the FWDN. Lastly, the MWDN maintains the received location information in a database.

One skilled in the art can appreciate that the steps illustrated above, with respect to FIGS. 8-10, may be altered in the ordering of steps and/or the number of steps. In other words, a smaller or larger number of steps may be employed without deviating from the scope of the invention. In one embodiment, the methods and applications of the eMAC 501 and the eMSG 510 modules may be realized in computer software. Further, one or more computing environments (e.g., computers, servers, etc.) may be utilized to host the eMAC 501 and the eMSG 510 modules. For example, both the eMSG 510 and the eMUA 511 may reside in a single computing environment with different functional hardware modules, wherein the eMSG 510 and eMUA 511 may remain functionally independent from each other. Additionally, each of the eMSG 510 and the eMUA 511 may each reside in independent computing environments that may span multiple servers, for example.

Figure 11:
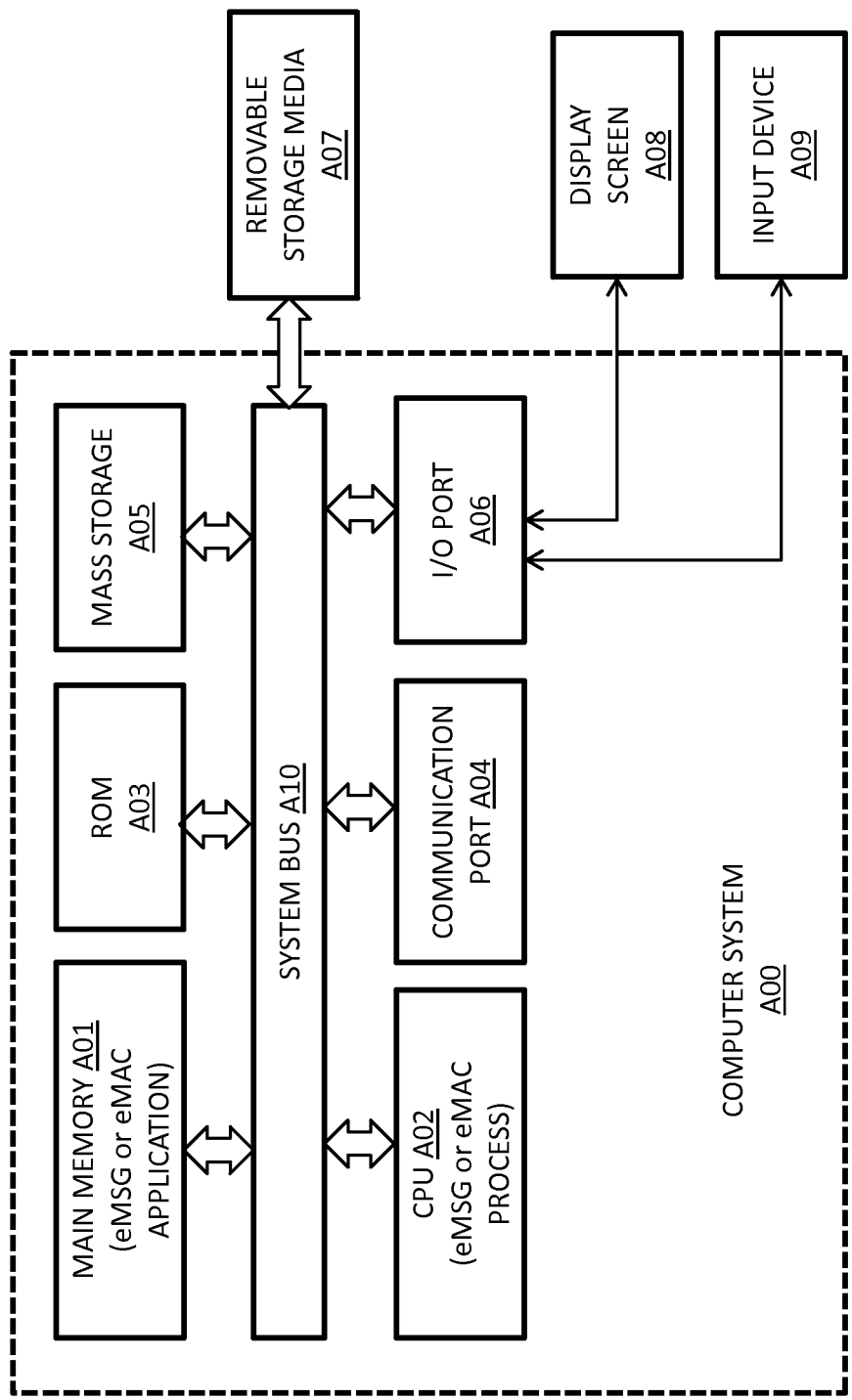
FIG. 11 illustrates an embodiment of a computer system configured to host and/or execute one or more components described herein.

FIG. 11 illustrates an embodiment of a computer system useful for implementing one or more embodiments described throughout this invention. One or more computing devices A00 may be used to perform the functions of an eMSG and/or an eMAC.

The computer system A00 comprises a system bus A10, a CPU A02, a communications port A04, a main memory A01, a removable storage media A07, a ROM A03, and a mass storage A05. The computer system A00 may be connected to one or more display screens A08, input devices A09, or peripheral devices (not shown).

The memory A01 may be RAM, or any other dynamic storage device commonly known by those skilled in the art. Read-only memory A03 may be any static storage device such as PROM chips used for storing static information such as instructions for CPU A02. Mass storage A05 may be used to store information and instructions. Mass storage A05 may be any storage medium know by those skilled in the art, including but not limited to a hard disk, an SSD, flash memory, and writeable optical discs to name a few.

The System Bus A10 provides for communication connections between each of the components of the Computer System A00. The System Bus A10 may be any buss transport know by those skilled in the art, including but not limited to PCI, PIC/X, SCSI, and USB to name a few.

The main memory A01 is encoded with one or more eMSG Applications A01A that support functionalities as discussed throughout the specification. The eMSG application A01A may be embodied as software code such as data and/or logic instructions (e.g., code stored in the memory or on another computer readable medium such as a disk) that support processing functionality according to different embodiments described herein. During operation of one embodiment, the CPU A02 accesses the main memory A01 via the use of the system bus A10 in order to launch, run, execute, interpret or otherwise perform the logic instructions of the eMSG application A01A. Execution of the eMSG application A01A produces processing functionality within the eMSG process A02a. In other words, the eMSG process A02A represents one or more portions of the eMSG application A01A performed within the CPU A02.

It should be noted that, in addition to the eMSG process A02A that carries out operations as discussed herein, other embodiments herein include the eMSG application A01A itself (i.e., the un-executed or non-performing logic instructions and/or data). The content of the eMSG application A01A may be stored on a computer readable medium. The eMSG application A01A can also be stored in a memory type system such as in firmware, ROM, PROM, and RAM, to name a few.

The Computer System A00 may also serve as a computing environment for an eMAC Application and its Processes. In another embodiment, the Computer System A00 may comprise more or less components. Additionally, more than one of any given component may exist, such as multiple CPUs, memories, storage devices, buses, etc.

Figure 12:
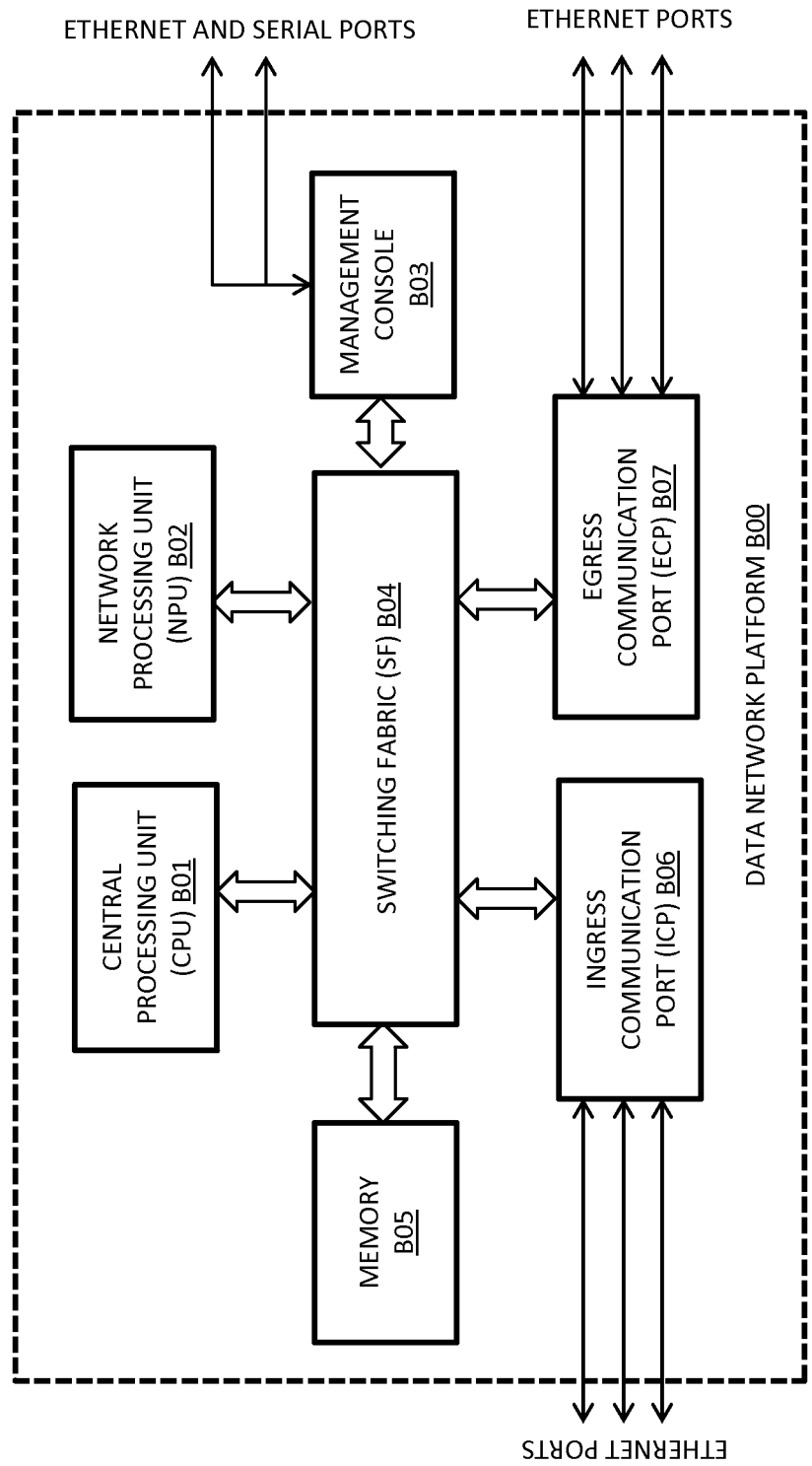
FIG. 12 illustrates an embodiment of the generic architecture of a data network platform that is used as the hardware platform of an eMUA.

In one or more embodiments, an eMUA is implemented in both software and hardware. FIG. 12 illustrates an embodiment of an architecture of a data network platform B00 that may be used as the hardware platform of an eMUA.

The Data Network Platform B00 comprises at least a CPU B01, a network processing unit (hereinafter "NPU") B02, a management console B03, a switching fabric (hereinafter "SF") B04, a memory B05, an ingress communication port (hereinafter "ICP") B06, and an egress communication port (hereinafter "ECP") B07.

The ICP B06 provides Ethernet ports for the eMUA as an NE to connect with and receive IP data packets from other NE(s). The ICP B06 connects with the SF B04 electronically through a data bus to communicate with other hardware units in the data network platform B00.

The ECP B07 provides Ethernet ports for the eMUA as an NE to connect with and transmit IP data packets to other NE(s). It connects with the SF B04 electronically through a data bus to communicate with other hardware units in the data network platform B00.

The MEMORY B05 stores data and instructions encoded to implement one or more embodiments of the eMUA. The encoded instructions are executable by the CPU B01 and/or the NPU B02.

The CPU B01 executes and processes encoded instructions stored in the MEMORY B05. In one embodiment, the CPU B01 is designated to mainly process the control-plane data of the eMUA. This allows for increased efficiency. The CPU B01 also connects to the SF B04 electronically through a data bus to communicate with other hardware units in the data network platform B00.

The NPU B02 executes and processes encoded instructions stored in the MEMORY B05. In one embodiment, the NPU B02 is designated to mainly process the user-plane data of the eMUA. The NPU B02 also connects to the SF B04 electronically through a data bus to communicate with other hardware units in the data network platform B00.

The Management Console B03 provides front-end management interfaces to allow a user to manage the eMUA locally and/or remotely. In one embodiment, the Management Console B03 offers a serial port and an Ethernet port for providing user access. The Management Console B03 also connects to the SF B04 electronically through a data bus to communicate with other hardware units in the data network platform B00.

The SF B04 connects with the CPU B01, the NPU B02, the Management Console B03, the Memory B05, the ICP B06 and the ECP B07 electronically through data buses to provide cross-connections so that any of the CPU B01, the NPU B02, the Management Console B03, the Memory B05, the ICP B06 and the ECP B07 can communicate with each other both electronically and logically.

Embodiments described herein may be provided as a computer program product, which may include a machine-readable medium having instructions stored therein, which when executed by a computer perform a process. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

Various modifications and additions can be made to the example embodiments discussed herein without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method for providing a mobile data service to a mobile device over a Fixed Wireless Data Network (FWDN), the method comprising:

coupling a Mobile Wireless Data Network (MWDN) with the FWDN via a first, a second and a third IP Transport Network (IPTN);

receiving a mobile data service request from a Public Land Mobile Network (PLMN), wherein the PLMN is coupled to the MWDN via a fourth IPTN;

confirming that the mobile device associated with the mobile data service request is communicatively coupled to and located with the FWDN by intercepting registration and location information transmitted from the mobile device;

verifying authenticity of the mobile data service request, wherein the mobile data service request is at least authenticated by the MWDN;

delivering mobile data service to the mobile device;
herein the mobile device transparently communicates with the PLMN;
receiving and separating a user-plane data and a first control-plane data associated with the mobile data service request; and
determining whether the user-plane data is communicated to the FWDN over one of the second and the third IPTN, wherein the first control-plane data comprises instructions for communicating the user-plane data;
delivering the user-plane data to the mobile device;
transmitting a second control-plane data to the FWDN over the first IPTN; and
instructing the FWDN to communicate the user-plane data to the MWDN over one of the second and the third IPTN.

2. The method of claim 1, wherein the mobile data service is delivered to the mobile device via the fourth IPTN and one of the second IPTN and the third IPTN.

3. The method of claim 1, wherein the first IPTN is a trusted-wireless network, wherein the second IPTN is an untrusted network, and wherein the third IPTN is a trusted network.

4. The method of claim 3, wherein the first IPTN is a commercial mobile data network, wherein an entity that maintains the commercial mobile data network is associated with an entity that maintains the MWDN.

5. The method of claim 3, wherein the third IPTN is commercial data network, wherein an entity that maintains the commercial data networks is associated with an entity that maintains the MWDN.

6. The method of claim 3, wherein data communicated over the first IPTN is encrypted, and wherein the MWDN directly exchanges IP data with the FWDN without passing through a firewall.

7. The method of claim 1, wherein the step of confirming a location of the mobile device further comprises:
sending a query to the mobile device via the first IPTN;
receiving a response to the query from the mobile device, wherein the response contains location information of the mobile device within in the FWDN; and
storing the mobile device's location information in a database.

8. The method of claim 1, wherein the second control-plane data comprises routing information for communicating the user-plane data between the mobile device and the MWDN via the third IPTN, wherein the third IPTN passes through a firewall.

9. The method of claim 1, wherein the second control-plane data comprises routing information for communicating the user-plane data between the mobile device and the MWDN via the fourth IPTN.

10. The method of claim 1, wherein the step of delivering the user-plane data to the mobile device further comprises:
establishing an IP connection, over the fourth IPTN, between the PLMN and the mobile device, wherein the IP connection passes through 1) the MWDN, 2) one of the second and the third IPTN, and 3) the FWDN; and
communicating the user-plane data between the PLMN and the mobile device via the IP connection.

* * * * *